(12) United States Patent
Fujimoto et al.

(10) Patent No.: US 10,055,487 B2
(45) Date of Patent: Aug. 21, 2018

(54) PREFERENCE VISUALIZATION SYSTEM AND CENSORSHIP SYSTEM

(75) Inventors: Jun Fujimoto, Tokyo (JP); Nobuyuki Nonaka, Tokyo (JP); Hiroshi Katsukura, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 248 days.

(21) Appl. No.: 14/006,217

(22) PCT Filed: Apr. 3, 2012

(86) PCT No.: PCT/JP2012/059093
§ 371 (c)(1),
(2), (4) Date: Sep. 19, 2013

(87) PCT Pub. No.: WO2012/137782
PCT Pub. Date: Oct. 11, 2012

(65) Prior Publication Data
US 2014/0019464 A1    Jan. 16, 2014

(30) Foreign Application Priority Data
Apr. 8, 2011   (JP) .................................. 2011-086407

(51) Int. Cl.
*G06F 17/30*   (2006.01)
(52) U.S. Cl.
CPC .............................. *G06F 17/30699* (2013.01)
(58) Field of Classification Search
CPC ............................................... G06F 17/30699

(Continued)

(56) References Cited

U.S. PATENT DOCUMENTS 6,976,070 B1 * 12/2005 Hoashi .............. G06F 17/30867
707/999.104
7,783,622 B1 * 8/2010 Vandermolen .... G06F 17/30867
707/708

(Continued)

FOREIGN PATENT DOCUMENTS

CN    101470754 A    7/2009
CN    101751458 A    6/2010

(Continued)

OTHER PUBLICATIONS

Jul. 3, 2012 International Search Report issued in International Patent Application No. PCT/JP2012/059093.

*Primary Examiner* — Hares Jami
(74) *Attorney, Agent, or Firm* — Oliff PLC

(57) ABSTRACT

The information processing system of the present application extracts data that satisfies both a predetermined relation condition characterized for each community regarding an object and a predetermined characteristic condition characterized for each community regarding an attribute of the object, from the decomposed text data that can identify the meaning, the decomposed text data obtained by decomposing text data based on individual person generated data generated by many individual persons who take part in and configure a main system, and extracts data that satisfies a particular condition indicating a predetermined particularity characterized for each community regarding the object so as to detect the predetermined particularity to make it available, thereby determining an individual person to be monitored and the contents of monitoring for controlling the monitoring.

24 Claims, 17 Drawing Sheets

(58) Field of Classification Search
USPC .......................................... 707/736, 754, 755
See application file for complete search history.

(56) References Cited

U.S. PATENT DOCUMENTS

| | | | | |
|---|---|---|---|---|
| 2005/0278336 | A1* | 12/2005 | Ito | H04N 7/17318 |
| 2006/0112134 | A1* | 5/2006 | Tsuboi | G06F 17/277 |
| 2006/0123338 | A1* | 6/2006 | McCaffrey | G06F 17/2294 |
| | | | | 715/234 |
| 2008/0133488 | A1* | 6/2008 | Bandaru | G06F 17/30864 |
| | | | | 707/999.3 |
| 2008/0154833 | A1* | 6/2008 | Jessus | G06N 7/005 |
| | | | | 706/47 |
| 2009/0013052 | A1* | 1/2009 | Robarts | G06F 17/30867 |
| | | | | 709/206 |
| 2010/0095353 | A1* | 4/2010 | Athsani | G06F 17/3089 |
| | | | | 726/4 |
| 2011/0041080 | A1* | 2/2011 | Fleischman | G06Q 30/02 |
| | | | | 715/751 |
| 2011/0087737 | A1* | 4/2011 | Smith | G06Q 30/0281 |
| | | | | 709/205 |
| 2011/0119130 | A1* | 5/2011 | Agan | G06Q 10/10 |
| | | | | 705/14.49 |
| 2012/0185472 | A1* | 7/2012 | Ahmed | G06F 17/30867 |
| | | | | 707/728 |

FOREIGN PATENT DOCUMENTS

| | | |
|---|---|---|
| JP | A 2001-028006 | 1/2001 |
| JP | A 2005-115468 | 4/2005 |
| JP | A 2006-146567 | 6/2006 |
| JP | A 2006-236379 | 9/2006 |

* cited by examiner

FIG. 2B
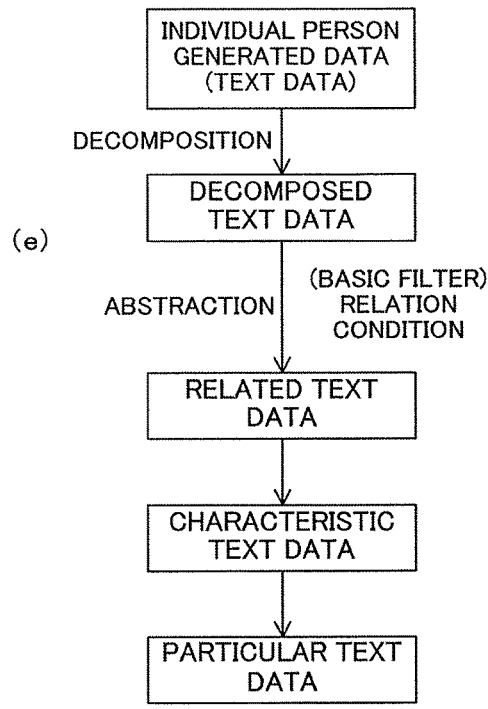
(e)
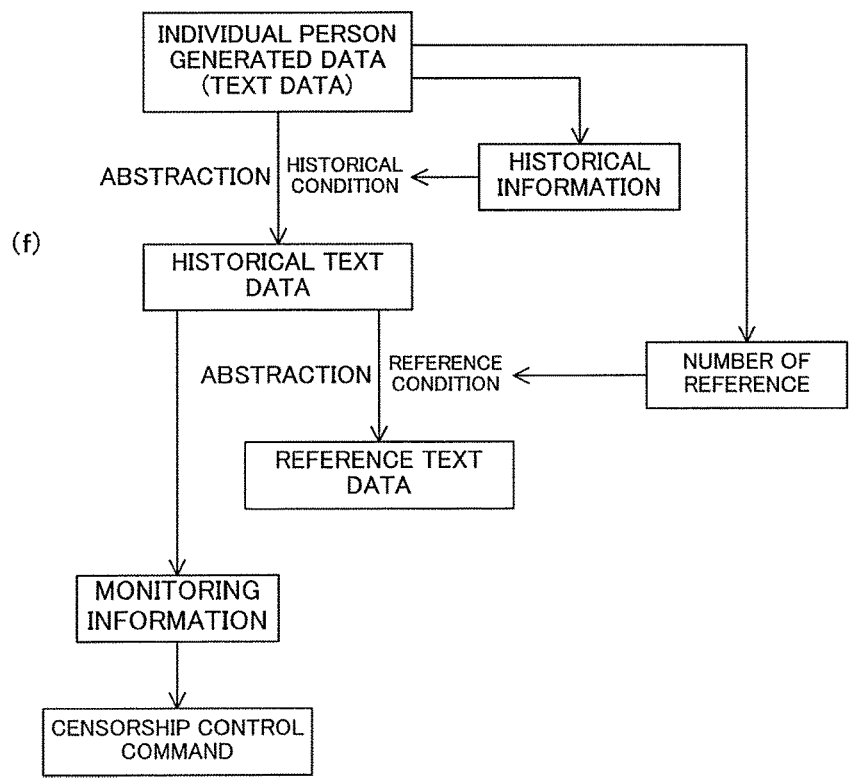
(f)

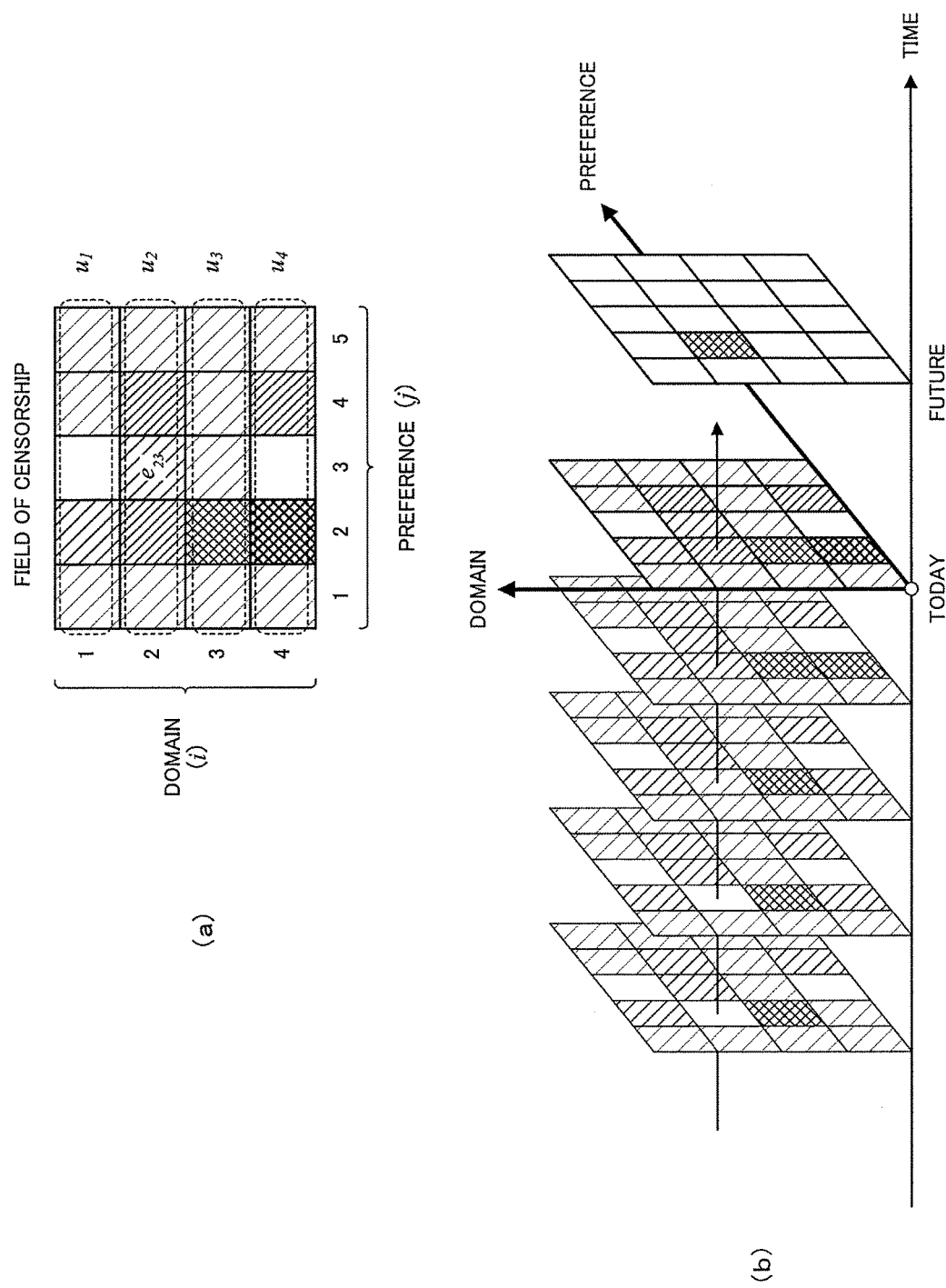

EXAMPLE 2: CUSTOMER SUPPORT IN ARTIFICIAL INTELLIGENCE

PREFERENCE VISUALIZATION SYSTEM AND CENSORSHIP SYSTEM

TECHNICAL FIELD

The present invention relates to a system which monitors text acquired via a network.

BACKGROUND ART

Conventionally, there has been a method and a device which block the provision of information that is determined to be inappropriate out of information provided via a network (for example, refer to Patent Document 1). Such method and device is for preventing children and the like from visibly recognizing information that is determined to be harmful out of information provided via a network. It has been determined whether or not the term should be blocked by extracting terms from information provided via a network and reading out significance to each of the extracted terms from a term list previously determined and stored.

PRIOR ART DOCUMENT

Patent Document

[Patent Document 1] Japanese Patent Application Laid-open No. 2001-28006

SUMMARY OF THE INVENTION

Problems to be Solved by the Invention

Although a conventional censorship system is effective for information in which a term to be inappropriate clearly appears, it has been incompetent to information which is transmitted after being subject to repression and deformation in a field of censorship. Here, the field of censorship is a space composed of a collection of text that is to be an object to be censored provided by a user.

Therefore, in a conventional main system which provides information service, no approach has been established to handle information which is transmitted after being subject to repression and deformation in the field of censorship formed for each community in which users of the main system participate, and thus such information has been often left untreated.

For example, in the case where the above-mentioned main system is an artificial intelligence system which answers questions from users, preference information present in the field of censorship is left untreated, and only answers to the question are given while lacking of a censoring function in the field of censorship.

In light of foregoing, the present invention is made and the purpose thereof is to provide an information processing system capable of properly addressing information, such as preference information, which is transmitted after being subject to repression and deformation in the field of censorship, or to provide an information availability system for the information concerned and an information availability function for the information concerned which are necessary to achieve the information processing system.

Means for Solving the Problems

An information processing system according to the present embodiment is provided with:

a field-of-censorship generation device for decomposing individual person generated data generated by an individual person into a plurality of decomposed data that can identify the meaning, extracting data that satisfies both a predetermined relation condition regarding an object indicated by each of the decomposed data and a predetermined characteristic condition regarding the object, and generating a collection of first extracted data extracted thereby as a field of censorship; and a device for making particularity available for extracting data that satisfies a particular condition indicating a predetermined particularity in connection with the object from the collection of the first extracted data, and detecting the predetermined particularity from second extracted data extracted thereby to make it available.

Effects of the Invention

It is possible to properly address information which is transmitted after being subject to repression and deformation in the field of censorship.

BRIEF DESCRIPTION OF THE DRAWINGS

FIG. 2B is a block diagram showing an overview of processing in the preference availability system and the censorship system according to the present embodiment.

FIG. 3(a) is a diagram showing an overview of a field of censorship in the preference availability system and the censorship system according to the present embodiment, and FIG. 3(b) is a diagram showing time change in the field of censorship.

MODE FOR CARRYING OUT THE INVENTION

Embodiments of the present invention will be described below based on drawings.

<<Overview of the Present Embodiment>>

Figure 1:
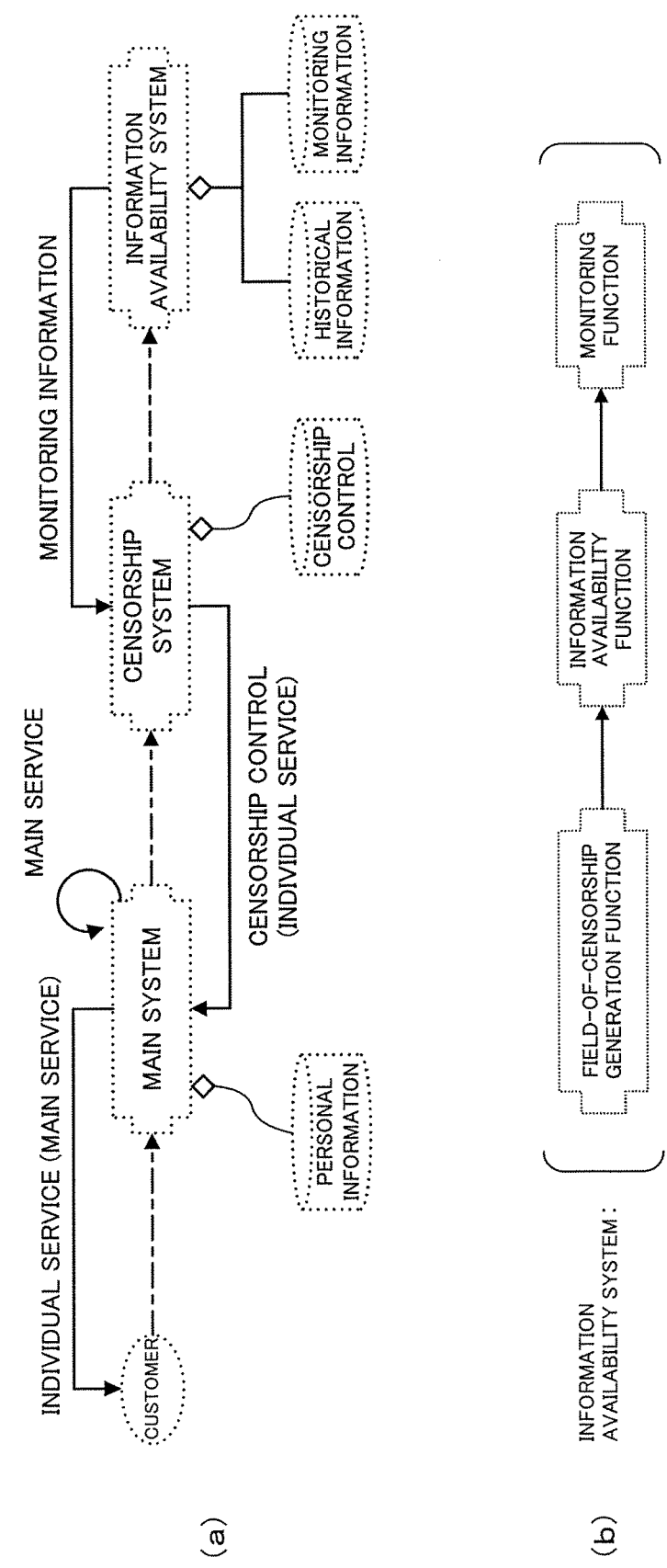
FIG. 1(a) is a block diagram showing an overview of a main system using a information availability system and a censorship system according to the present embodiment.
FIG. 1(b) is a block diagram showing an overview of the preference availability system.

FIG. 1(a) is a block diagram showing an overview of a main system using a information availability system and a censorship system according to the present embodiment.

A customer (an individual person) of a main system inputs a variety of text data by an entry box on the web screen, e-mail, blog, a bulletin board, Twitter, and the like. This is a transmission of information of the individual person. Such text data is acquired by the main system. In general, the transmission of information by the individual person is stored in a server of the main system as text data in a state where it can be read via a network.

The main system is the system which offers service mainly such as an EC site, SNS, a search site, an artificial intelligence site, etc. The main system provides a customer of the main system with individual service (main service) in accordance with the main system. In addition, the EC site is the site which mainly offers a company's own products and services utilizing a network. Furthermore, SNS is the service mainly for forming a social network using a variety of networks in order to encourage a person-to-person communication. The search site is the site which mainly offers service for searching a web site of interest in order to acquire a variety of information. Furthermore, the artificial intelligence is the site which is configured to offer service capable of having an automatic conversation via a network.

The main system has a database which stores personal information on a customer of the main system. The personal information is the information on a customer, such as real name and address of the customer, which is necessary for the service offered by the main system.

The main system supplies the transmission of information acquired from the customer to a censorship system. The censorship system has a database for executing a variety of censorship controls. The censorship system generates a field of censorship, and provides a censorship control (individual service) suitable for the main system with reference to a database for the censorship control, as described below. For example, when it is determined that a customer is interested in a new product, a variety of information on the new product is provided for him/her. Furthermore, information, music, moving images or the like which gives a peace of mind is provided for a customer who bears a psychological or mental burden. Furthermore, if a person transmits anti-socialistic information and information counter to common sense, a variety of services can be suspended, such as termination of the network connection The censorship system supplies information for censoring regarding the transmission of information acquired from the customer to a information availability system. The information availability system accumulates historical information out of the supplied information for censoring, and also generates monitoring information from the historical information to supply it to the censorship system. The censorship system provides the main system with the censorship control (individual service) described above based on the supplied monitoring information.

FIG. 1(b) is a block diagram showing an overview of the information availability system according to the present embodiment. The information availability system is composed of a field-of-censorship generation function, a information availability function, and a monitoring function. The field-of-censorship generation function is the function for detecting a particularity regarding the transmitted information from the generated field of censorship so as to make the particularity available. The monitoring function is the function for monitoring mainly an individual person who has transmitted information, with regard to the transmitted information from which the particularity is detected.

Figure 2A:
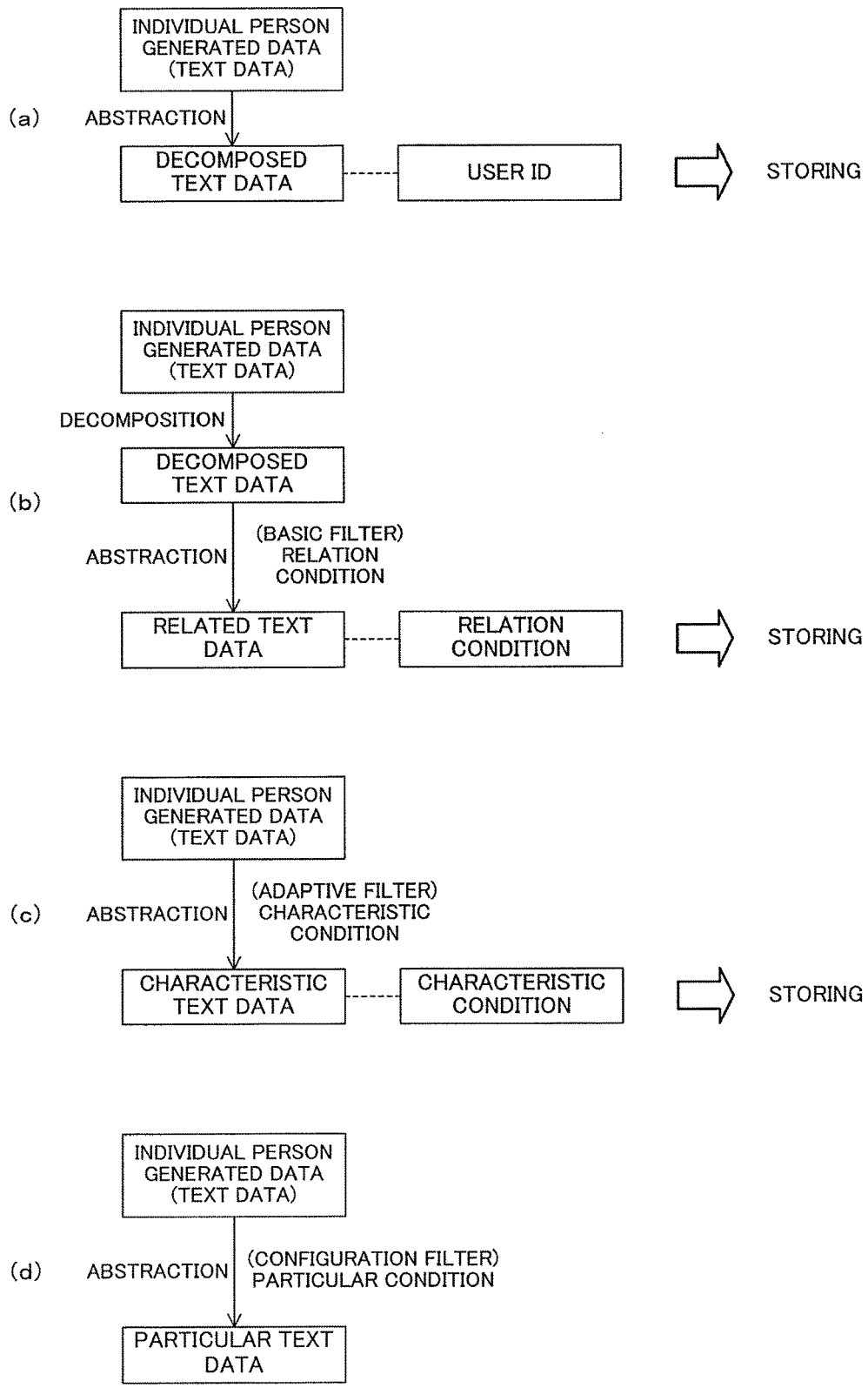
FIG. 2A is a block diagram showing an overview of processing in the preference availability system and the censorship system according to the present embodiment.

FIGS. 2A and 2B are block diagrams showing an overview of a preference availability system and a censorship system according to the present embodiment.

<<First Aspect>>

According to a first aspect of the present embodiment, a system includes a computer for receiving single external information containing text data composed of a plurality of character strings and executing a program that extracts information particular to the contents thereof, the computer executing the program so as to execute the procedures of:

abstracting input text data to convert it into a plurality of related text data that is previously prepared;

determining related data as particular related text data if a particular condition indicating a predetermined particularity regarding an object indicated by the related text data is satisfied with regard to the one external information; and storing the related text data determined as the particular related text data in connection with the condition regarding a user ID contained in the external information for identifying an individual person and the condition regarding the particular condition.

For example, a new preference extraction function is provided which captures an expression frequently appeared in a conversation of a particular individual person as a particular one. This makes it possible to indirectly determine food and hobbies which the individual person likes, or a genre which the individual person is interested in.

<<Second Aspect>>

Furthermore, according to a second aspect of the present embodiment, it is included the steps of:

abstracting data containing predetermined contents from text data based on individual person generated data generated by an individual person, and decomposing the abstracted text data into decomposed text data that can identify the meaning; and storing the decomposed text data in connection with a user ID that can identify the individual person who has generated the individual person generated data.

A second aspect of the present embodiment will be described with reference to FIG. 2A(a). First, data containing a predetermined kind of contents is abstracted from text data based on an individual generated data generated by an individual person. In the present embodiment, the individual generated data is just has to be data generated by an individual person, including text data which is input by an individual person by means of a keyboard, for example. This kind of text data includes text data input in an input box on a web screen, e-mail, blog, a bulletin board, Twitter (Registered Trademark), etc. Furthermore, the data generated by an individual person also includes voice data, image data, etc. In case of the voice data and the image data, executing recognition processing can convert the data into text data. The text data based on the individual person generated data generated by an individual person means the text data which is converted from the voice data, the image data and the like in this way.

Furthermore, a predetermined kind of contents includes personal information, for example. Here, the personal information refers to the information such as name, address, telephone number and the like by which an individual person can be directly identified. In addition, although an account and a handle name may identify an individual person by referring to other databases and the like, the individual person itself cannot be identified directly by the information itself, and thus they are not regarded as the personal information. In this way, abstracting a predetermined kind of contents makes it possible to prevent the predetermined kind of contents such as the personal information from being contained in the text data to be processed.

Furthermore, the text data in which the predetermined kind of contents is abstracted is decomposed into decomposed text data capable of identifying the meaning. For example, the processing for decomposing data into the decomposed text data capable of identifying the meaning includes the morphological analysis, etc. The morphological analysis can separate the text data into predetermined parts of speech such as noun, verb, and adjective, and into unit data that can identify the meaning.

Yet further, the decomposed text data is stored in connection with an user ID. Here, the user ID is information by which an individual person who has generated individual person generated data can be identified. In addition, the information is just has to be one that can identify an individual person, and thus it necessarily has to be one for identifying personal information.

This provides the abstraction of data containing a predetermined kind of contents, so that it is possible to prevent the data indicating a predetermined kind of contents contained in the individual person generated data, such as personal information, from leaking out of the preference availability system and the censorship system to the outside.

The decomposed text data corresponds to a "related term".

<<Third Aspect>>

Furthermore, according to a third aspect of the present embodiment, it is included the steps of:

decomposing text data based on individual person generated data generated by an individual person into decomposed text data that can identify the meaning, and extracting related text data indicating a related object that satisfies a predetermined relation condition regarding a predetermined object indicated by the decomposed text data out of the decomposed text data; and storing the related text data in connection with the predetermined relation condition.

A third aspect of the present embodiment will be described with reference to FIG. 2A(b). First, a related text data indicating a related object is extracted from the decomposed data. The decomposed text data is unit data in which the text data is divided so as to be able to identify the meaning, as described above.

The related object is the object that satisfies a predetermined relation condition regarding an object indicated by the decomposed text data. A predetermined object indicated by the decomposed text data is a variety of topics and contents contained in text data such as e-mail. Specifically, a predetermined kind of food, car, and tourist destination are included. The relation satisfies a predetermined relation condition. For example, when a predetermined object is ramen noodle as food, a predetermined relation condition is defined so that the related object can include ramen noodle with soup flavored with soy source, salt, pork bone broth, etc.

Such predetermined object and relation condition can be defined so that information that an operator of the censorship system desires can be extracted. When only the predetermined object is extracted, the related object cannot be extracted, and thus the extraction result may be insufficient. The relation condition is appropriately defined, so that it is possible to extract not only the predetermined object, but also information containing both the predetermined object and the related object in relation thereof. An operator of the censorship system defines the relation condition, so that it is possible to extract the desired information adequately, i.e., not so broadly and narrowly.

A step of extracting the related text data indicating the related object which satisfies the predetermined relation condition corresponds to a "basic filter." One relation condition corresponds to one basic filter. The step of extracting a related text data from a decomposed text data by one relation condition generates one domain. One domain includes both the decomposed text data indicating a predetermined object, and the decomposed text data indicating a related object. The related text data is composed of the decomposed text data indicating a predetermined object, and the decomposed text data indicating a related object.

The domain means a collection which is composed of the related text data extracted from the decomposed text data. Making the relation condition different generates a single domain in accordance with that relation condition. The operator of the censorship system can define the relation condition. Therefore, the operator of the censorship system can define a plurality of relation condition so as to be able to acquire a desired extracted result, and generate a domain for each thereof.

As shown in FIG. 3(a), the domain for indicating the relation condition described above is configured. The domain is for classifying and identifying a plurality of relation conditions. Therefore, the domain is generated corresponding to each of a plurality of relation conditions.

The example of the field of censorship shown in FIG. 3(a) represents only four domains, namely $u_1$ to $u_4$. As described above, making the relation condition (the basic filter) different generates four domains ($u_1$ to $u_4$). In FIG. 3(a), each of four domains is indicated by in a surrounding broken line. As mentioned below, each of four domains ($u_1$ to $u_4$) is composed of five partial spaces. The domains shown in FIG. 3(a) represent the example in the figure in which four domains ($u_1$ to $u_4$) are generated using four relation conditions (basic filters). The related text data satisfying the relation condition belongs to each of the domains, the relation condition corresponding to each of the domains.

Furthermore, the extracted related text data is stored in connection with a predetermined relation condition. This makes it possible to store not only the related text data but also the predetermined relation condition by which the related text data is extracted, and thus the condition of the following processing can be appropriately defined. Specifically, not only a single term in information that a predetermined individual person has been transmitted is regarded as an object of the censorship, but also terms in relation to a single term included in the transmitted information, for example slang, can be included. The region to be censored can be broadened.

<<Fourth Aspect>>

Furthermore, according to a fourth aspect of the present invention, it is included the steps of:

extracting characteristic text data that satisfies a predetermined characteristic condition regarding an attribute of an object indicated by text data out of the text data based on individual person generated data generated by an individual person; and storing the characteristic text data in connection with the predetermined characteristic condition.

A fourth aspect of the present embodiment will be described with reference to FIG. 2A(c). First, a characteristic text data that satisfies a predetermined characteristic condition is extracted from text data. The predetermined characteristic condition is a condition regarding an attribute of a predetermined object indicated by the text data. The attribute is a variety of characteristics of the predetermined object, such as a property and a feature. The variety of characteristics may be not only an objective characteristic, but also a characteristic which is subjectively expressed based on feelings and emotion regarding the predetermined object.

Furthermore, the attribute can be regarded as so-called preference. An emotional characteristic regarding a predetermined object and a statistical characteristic regarding a predetermined object are included. The emotional characteristic includes an emotional expression with aggression and sentiment, an emotional expression with impulse, an expression of desire regarding a predetermined object. Furthermore, the statistical characteristic includes a variety of statistics regarding a predetermined object such as number of times and time, and techniques and means for acquiring the variety of statistics.

The attribute (preference) is processed by being quantified as a characteristic parameter. The quantification enables the characteristics of the object to be censored and the related object to be evaluated. For example, the attribute can extract the expression of feelings and emotion of an individual person who has generated an individual person generated data from an adjective expression and an adverbial expression and the like contained in text data based on the individual person generated data.

Specifically, when a predetermined object and a related object are food, a variety of characteristics are included that are objectively and subjectively discussed by an individual person with regard to the predetermined object and the related object, such as tasty, tasteless, sweet, spicy, hot, cold, want to eat again, never want to eat again, etc., as the attribute regarding the predetermined object and the related object. Furthermore, when a predetermined object and a related object are a car, a variety of characteristics are included that are objectively and subjectively discussed by an individual person with regard to the predetermined object and the related object, such as good at gas mileage, poor at gas mileage, ecological, hybrid, large in size, small in size, want to purchase definitely, not purchased yet, etc.

A step for extracting the characteristic text data that satisfies the predetermined characteristic condition corresponds to a "adaptive filter". The step generates a particle space. In this case, the characteristic text data is extracted from the text data based on the individual person generated data.

Although the fourth aspect of the present embodiment described above illustrates the case where the characteristic text data is extracted from the text data based on the individual person generated data generated by an individual person, the characteristic text data may be extracted from the decomposed text data generated in the second aspect described above, or the characteristic text data may be extracted from the related text data generated in the third aspect described above.

<Case of Extracting Characteristic Text Data from Related Text Data>

It is particularly desirable that the characteristic text data is extracted from the related text data extracted in the third aspect. Extracting the characteristic text data from the related text data generates a partial space. In this case, the attribute is not only a predetermined object, but also a variety of characteristics such as properties and features of both the predetermined object and the related object. The variety of characteristics may be not only an objective characteristic, but also the characteristic that is subjectively expressed based on feeling and emotion. This makes it possible to extract not only the characteristic text data indicating the attribute of the predetermined object, but also the characteristic text data indicating the attributes of both the predetermined object and the related object.

Although an example of the field of censorship shown in FIG. 3(a) includes only five attributes (preferences), namely j=1 to 5, the preference can be switched by making the characteristic condition (adaptive filter) different as described above. The field of censorship shown in FIG. 3(a) represent the example in the figure in which five preferences are defined by using five characteristic conditions (adaptive filters).

In the generated domain, one partial space can be specified by defining the relation condition (basic filter) and the characteristic condition (adaptive filter). Therefore, the characteristic text data that satisfies the relation condition (basic filter) and the characteristic condition (adaptive filter) belong to the partial space.

For example, in the example of FIG. 3(a), a domain ($u_2$) can be extracted by using a predetermined relation condition (basic filter) (the relation condition corresponding to i=2). Then, a partial space ($e_{23}$) (i, j)=(2, 3) in the domain ($u_2$) can be extracted by using a predetermined characteristic condition (adaptive filter) (the characteristic condition corresponding to j=3) as a preference to the extracted domain ($u_2$). That is, in the example of FIG. 3(a), one partial space can be extracted out of twenty partial spaces ($e_{11}$ to $e_{45}$) by the predetermined relation condition (basic filter) and the characteristic condition (adaptive filter). Extracting the partial space enables the characteristic text data belonging to the extracted partial space to be extracted. For example, the characteristic text data belonging to the partial space (i, j)=(2, 3) can be extracted.

As shown in FIG. 3(a), each of four domains ($u_i$) (i=1 to 4) is composed of five partial spaces. The domain ($u_1$) is composed of five partial spaces ($e_{11}$ to $e_{15}$), the domain ($u_2$) is composed of five partial spaces ($e_{21}$ to $e_{25}$), the domain ($u_3$) is composed of five partial spaces ($e_{31}$ to $e_{35}$), and the domain ($u_4$) is composed of five partial spaces ($e_{41}$ to $e_{45}$).

The field of censorship can be configured by the partial space generated based on a plurality of relation conditions (basic filter) and a plurality of characteristic conditions (adaptive filter). In the field of censorship, a plurality of desired partial spaces can be specified by using a plurality of predetermined relation conditions (basic filter) and a plurality of predetermined characteristic conditions (adaptive filter). This enables an operator of the censorship system to specify the partial space that is desired to be censored because it is necessary.

Furthermore, the characteristic text data that satisfies the predetermined characteristic condition can be extracted from both the decomposed text data indicating the predetermined object and the decomposed text data indicating the related object. That is, the decomposed text data containing the object that satisfies the predetermined characteristic condition either the predetermined object or the related object is extracted as the characteristic text data.

Furthermore, a distribution property composed of the decomposed text data and the characteristic text data can be extracted in the field of censorship. The distribution property reflects the aspect of transmission of information after being subject to repression and deformation in the field of censorship. An operator of the censorship system can select one or a plurality of partial spaces required to be censored, based on the distribution property.

Yet further, the characteristic text data is stored in connection with the predetermined characteristic condition. This makes it possible to store not only the characteristic text data, but also the predetermined characteristic condition by which the characteristic text data is extracted. The condition of the following processing thus can be appropriately defined.

<<Fifth Aspect>>

Furthermore, according to a fifth aspect of the present embodiment, it is included the step of extracting particular text data that satisfies a particular condition indicating a predetermined particularity regarding an object indicated by text data out of the text data based on individual person generated data generated by an individual person.

A fifth aspect of the present embodiment will be described with reference to FIG. 2A(d). First, a particular text data that satisfies a particular condition indicating a predetermined particularity is extracted from text data. The particular condition indicating the predetermined particularity means the particularity regarding a predetermined object, for example. The particularity can be determined by whether a variety of amounts, degree and rate of change regarding the predetermined object are larger or smaller than a predetermined threshold value. The variety of amounts, degree and rate of change are parameters which can be calculated by predetermined computational processing and can characterize events occurred regarding the predetermined object.

A step of extracting the particular text data that satisfies the predetermined particular condition corresponds to a "configuration filter." The step generates a candidate space. In this case, the particular text data can be extracted from text data based on an individual person generated data.

The particular text data that satisfies the particular condition indicating the predetermined particularity regarding an object indicated by the text data is extracted, so that the range of the object to be monitored can be defined, and thus it is possible to reduce the possibility that the result of monitoring contains noise.

<<Sixth Aspect>>

Furthermore, according to a sixth aspect of the present embodiment, it is included the steps of:

decomposing text data based on individual person generated data generated by an individual person into decomposed text data that can identify the meaning, and extracting related text data indicating a related object that satisfies a certain relation condition regarding an object indicated by the decomposed text data out of the decomposed text data;

extracting characteristic text data that satisfies a predetermined characteristic condition regarding an attribute of an object indicated by text data out of the related text data; and extracting particular text data that satisfies a particular condition indicating a predetermined particularity regarding an object indicated by the characteristic text data.

A sixth aspect of the present embodiment will be described with reference to FIG. 2B(e). As shown in FIG. 2B(e), the configuration can be made so that the particular text data is extracted from the characteristic text data. Here, the characteristic text data decomposes the text data based on the individual generated data into the decomposed text data by a preference availability operation for the censorship according to the second aspect. Then, the related text data is extracted from the decomposed text data by a preference availability operation for the censorship according to the third aspect. Then, the characteristic text data is extracted from the related text data based on the preference availability operation for the censorship according to the fourth aspect. In the preference availability operation for the censorship according to the sixth aspect, the particular text data is extracted from the characteristic text data extracted in this way.

In this manner, extracting the particular text data from the characteristic text data can generate a candidate space inside of the partial space. For example, in the example of the field of censorship shown in FIG. 3(a), candidate spaces that satisfy the particular condition indicating a predetermined particularity are generated to twenty partial spaces. Satisfaction of the particular condition results in the extraction of the candidate space. The number of partial spaces constituting the candidate space may be one or more.

The particular condition indicating the predetermined particularity means the particularity regarding not only a predetermined object but also both a predetermined object and a related object. For example, it can be determined by whether a variety of number, amount, degree and rate of change regarding the predetermined object and the related object are larger or smaller than a predetermined threshold value. The variety of number, amount, degree and rate of change are parameters which can be calculated by predetermined computational processing and can characterize events occurred regarding the predetermined object and the related object.

In particular, when a plurality of partial spaces is configured and the predetermined object and the related object in a part of partial spaces have some kind of particularity with regard to the predetermined object and the related object in the rest of the partial spaces, the step of extracting the particular text data that satisfies the predetermined particular condition can extract the particular text data indicating the predetermined object and the related object contained in a part of partial spaces which is determined as having the particularity.

For example, the number of times of appearance of a word (transmission of information) of "ramen" in a part of partial spaces in a predetermined domain is more frequent than in the rest of partial spaces, the particular text data is extracted from the related text data and the characteristic text data containing the term "ramen" as satisfying the predetermined particular condition. Furthermore, when the rate of change of the number of times of appearance of the term indicating a product name of new product is higher than in the rest of partial spaces, the particular text data is extracted as satisfying the predetermined particular condition. In this way, comparison regarding the predetermined object and the related object is done among a plurality of partial spaces, it is possible to acquire the partial spaces in which the predetermined object and the related object are unbalanced, and the distorted partial spaces. It is thus possible to determine the particularity regarding the predetermined object and the related object to extract the particular text data.

Furthermore, a single predetermined community described below can be made to correspond to a single domain so as to find the partial space having the particularity among a plurality of communities, when a plurality of partial spaces are configured, thereby determining the particularity regarding the predetermined object and the related object.

The particular text data that satisfies the particular condition indicating the predetermined particularity regarding an object indicated by the text data is extracted, so that it is possible to define the range of the object to be monitored based on the predetermined relation condition (basic filter) and the predetermined particular condition (adaptive filter), and thus it is possible to reduce the possibility that the result of monitoring contains noise.

Furthermore, an information availability technique is also equipped which determines the importance of the particularity by not only the presence of the particular text data, but also the frequency of appearance and distribution of the particular data.

<<Seventh Aspect>>

Furthermore, according to a seventh aspect of the present embodiment, it is included the steps of:

generating historical information regarding history of an object indicated by text data based on individual person generated data generated by an individual person, and extracting historical text data that satisfies a predetermined historical condition regarding the historical information out of the text data based on the individual person generated data; and generating the number of reference in connection with a user ID that can identify the individual person who has generated the individual person generated data, the number of reference indicating how many times the text data based on the individual person generated data is referred to, and extracting reference text data that satisfies a predetermined reference condition regarding the number of reference out of the text data based on the individual person generated data.

Here, a count as the number of reference is the count based on the reference of data corresponding to the user ID for identifying an individual person or posting number, which corresponds to "RT" in the case of Twitter and corresponds to "Re:" in the case of e-mail. For example, when a comment on a new product is extracted, the importance of the posting by a person who has posted in the first place is not necessarily increases with regard to the product name of the new product mentioned by a person who has posted in the first place, i.e., the abstracted term. The number of reference does not refer to the abstracted data that simply appears frequently and many times, but is for extracting the fact that the posting is receiving attention, i.e. the number of reference increases with regard to, for example, the posting made by a celebrity, such as "Mr./Ms. A has said that," "the somethingth posting has been mentioned in this way", and the like.

A seventh aspect of the present embodiment will be described with reference to FIG. 2B(f). First, a historical information is generated which relates to the history of an object indicated by text data based on an individual person generated data generated by an individual person. The historical information is the information indicating the history regarding the object indicated by the text data. For example, it includes the number and frequency showing that a term regarding the object is contained in the text data, and the number, frequency, and rate of appearance of the text data containing the term regarding the object. This makes it possible to acquire the number of times, frequency and rate of appearance of information on the object that is generated in the past by an individual person who has generated individual person generated data. Using the historical information can provide the determination not only by using a certain time of day and a certain period of time, but also by including the state of progress and change. Furthermore, the determination can be done using varying in density level, frequency and number of times of something regarding the predetermined object, and the degree of change in temporal transition.

Furthermore, the historical text data that satisfies a predetermined historical condition regarding the historical information is extracted from the text data.

The number of reference indicating the number of times that the text data based on the individual person generated data is referred is generated in connection with the user ID. The number of reference is the number that the text data based on the individual person generated data is referred by other individual person. More specifically, it is the number that the text data based on the individual person generated data generated by a single individual person is referred by other individual person.

Furthermore, reference text data that satisfies a predetermined reference condition regarding the number of reference is extracted from the text data based on the individual person generated data.

The search can be done by the historical information while including the situation changing with time. Furthermore, enormousness of influence of an individual person corresponding to the user ID can be acquired by the number of reference.

Although the seventh aspect of the present embodiment described above has showed the case of generating the historical information and extracting the historical text data from the text data based on the individual person generated data generated by an individual person, the historical data may be extracted from the decomposed text data generated in the second aspect, from the related text data extracted in the third aspect, and from the characteristic text data extracted in the sixth aspect.

<Case of Extracting Characteristic Text Data from Historical Text Data>

It is particularly desirable that the historical text data is extracted from the characteristic text data extracted in the sixth aspect. Extracting the historical text data form the characteristic text data generates a monitoring space from the candidate space. More specifically, as shown in FIG. 3(a), the domain is generated by the third aspect, the partial space is generated by the fourth aspect, the candidate space is generated by the fifth aspect, and the monitoring space is generated by this seventh aspect.

This case includes the number and frequency of the term in relation to not only a predetermined object but also both the predetermined object and a related object included in the text data, frequency and rate of appearance of the text data containing the term in relation to both the object and the related object, etc. These make it possible to acquire the number of times, frequency and rate of appearance of information on the object and the related object that are generated in the past by an individual person who has generated individual person generated data. Using the historical information can provide the determination not only by using a certain time of day and a certain period of time, but also by including the state of progress and change. Furthermore, the determination can be done using varying in density level, frequency and the number of times of something regarding the predetermined object, and the degree of change in temporal transition. This makes it possible to extract and generate the partial space changing with time as the monitoring space.

<<Eighth Aspect>>

Furthermore, according to an eighth aspect of the present embodiment, it is included the step of generating monitoring information based on the historical text data.

The monitoring mainly means for example, monitoring bases on the historical text data, an individual person who has generated an individual person generated data that is a source of the historical text data, monitoring an object indicated by the historical text data based on the historical text data, and monitoring both the individual person and the object. The monitoring information is information indicating the individual person and object to be monitored, and the contents and methods of monitoring thereto. Furthermore, the individual person to be monitored can be defined by using the user ID.

<<Ninth Aspect>>

Furthermore, according to a ninth aspect of the present embodiment, it is included the step of generating a censorship control command based on the monitoring information.

The censorship control command is generated as a specific executable command in response to the individual person and object to be monitored, and to the contents and method of monitoring thereto. For example, the censorship control command includes one executable by software processing that transmits a predetermined message and a predetermined data to the user ID to be monitored. Furthermore, the censorship control command includes one executable by hardware processing such as termination of the electrical connection of the network. Furthermore, the censorship control command may execute new information provision appropriate to preference property of the individual person. In this way, it is included not only repression and deformation of the provision of service, but also execution of the provision of new service and related information.

From the fact explained above, an information processing system can be provided as follows. The information processing system is provided with:

a field-of-censorship generation device for decomposing text data based on individual person generated data generated by an individual person into decomposed data that can identify the meaning, extracting data that satisfies both a predetermined relation condition regarding an object indicated by the decomposed text data and a predetermined characteristic condition regarding the object, and generating a collection of first extracted data extracted thereby as a field of censorship; and a device for making particularity available for extracting data that satisfies a particular condition indicating a predetermined particularity regarding the object from the collection of the first extracted data, and detecting the predetermined particularity from second extracted data extracted thereby to make it available.

Furthermore, it is desirable that the information processing system has a monitoring device for determining an individual person to be monitored and the contents of monitoring for controlling the monitoring based on the second extracted data.

<<Network Environment Including Monitoring System>>

Figure 4:
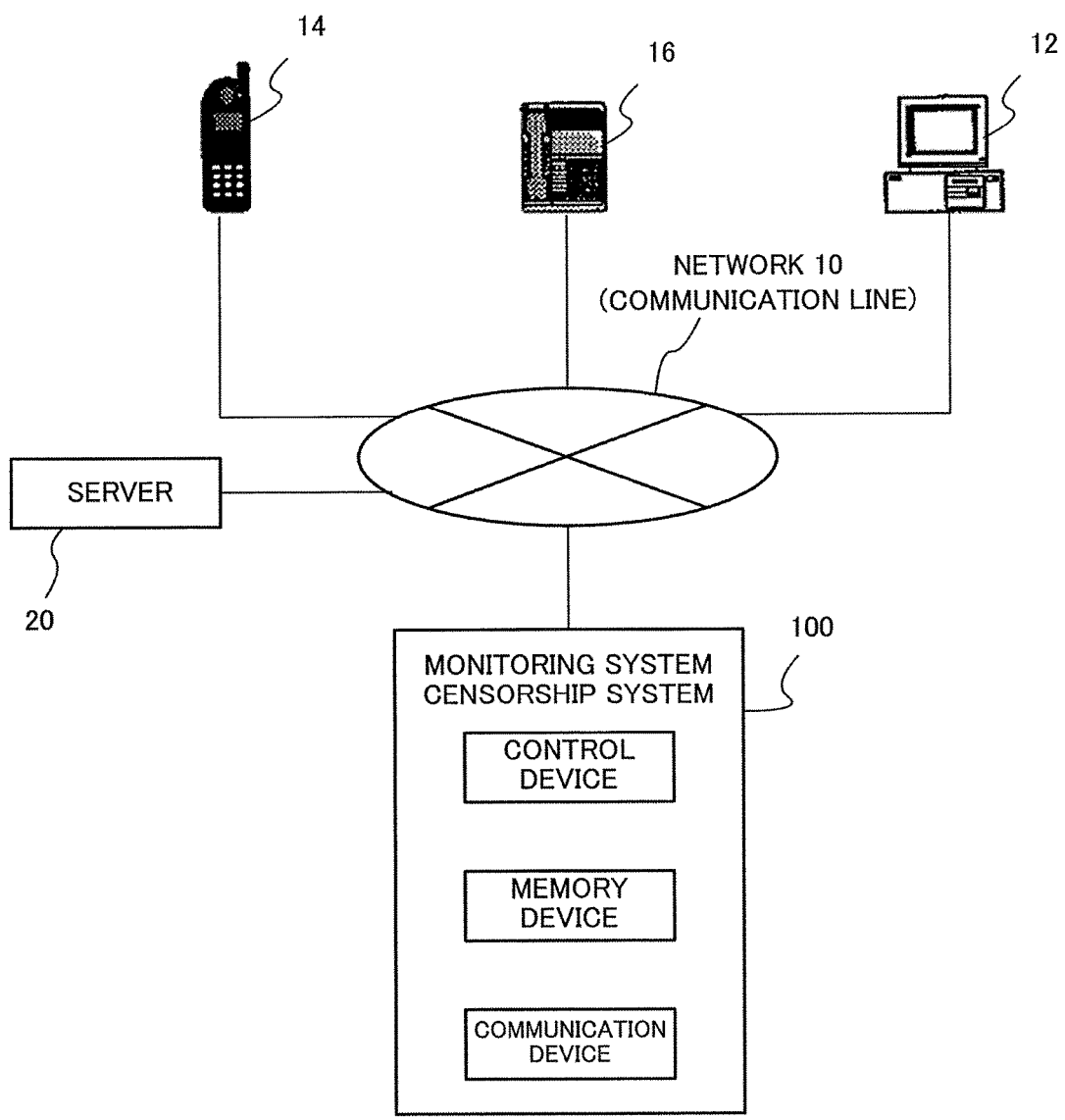
FIG. 4 is a diagram showing an example of a network to which the preference availability system (the censorship system) of the present embodiment is connected.

FIG. 4 is a diagram showing an example of a network to which the monitoring system (the censorship system) of the present embodiment is connected.

<<Network 10>>

On a network 10, a variety of terminal devices and a monitoring system 100 are communicatively connected with one another. On the network 10, nodes composed of a variety of telecommunication equipment, such as a router and a hub (not shown), is mutually connected to form a communication network. On the network 10, communication can be established among a variety of terminal devices and the monitoring system 100 which are connected to the network 10, irrespective of the type of line such as wired, wireless, leased, switched, a local area network. A variety of information traveling across the network 10 is divided into a plurality of packets and the like to be transferred among the nodes. This makes it possible to transmit information from an originating terminal device to a destination terminal device.

<<Terminal Device>>

The variety of terminal devices communicatively connected to the network 10 include a computer 12, a cellular phone 14, a fixed-line phone (including an IP telephone) 16, a portable terminal device (not shown), etc. The portable terminal device is connected to the network 10 via a wireless communication network (not shown). Furthermore, the fixed-line phone 16 is connected to the network 10 via a fixed-line network (not shown). The terminal device is mainly operated by an individual person, and can send out a variety of data input and generated by an individual person to the network 10.

<<Server 20>>

A server 20 stores a variety of data input or generated at the variety of terminal devices. The server 20 includes a variety of servers such as a web server, a mail server, a database server, etc. The server 20 is just necessary to be one in which stores the data transmitted from the terminal device so that the monitoring system 100 can read out the stored data via the network 10, irrespective of the type, function, number thereof.

Furthermore, the server 20 also stores creator identification data for identifying a creator who creates data which is input of generated by the terminal device. The data itself which is input or generated at the terminal device may contain the creator identification data. Also, date/time data is stored which indicates date and time of inputting or generating the data at the terminal device. Such the creator identification data and the date/time data are just necessary to be ones which are stored so that the monitoring system 100 can read out, likewise the data input or generated at the terminal device.

<<Monitoring System 100 (Censorship System)>>

The monitoring system 100 is connected to the network 10 always or for each predetermined timing. The monitoring system 100 mainly collects and acquires a variety of data stored in the server 20. In addition, a variety of data sent from not the server 20 but a variety of terminal devices may be collected. Either way, it is just necessary to acquire, via a network, a variety of data input/generated by an individual person operating a variety of terminal devices. The case of acquiring a variety of data from the server 20 will be described below.

The data input/generated at the terminal device is mainly text data input/generated by an individual person. In addition, the text data is just necessary to be one which can be converted into text format if it is in binary format.

Those text data are just necessary to be the data which is transmitted by an individual person via the network 10, as well as the data in which the monitoring system 100 can collect via the network 10, such as the data generated as blog, short data such as so-called Twitter, etc. Specifically, it is just necessary that the data is in text format which can be transmitted to the public by an individual person and collected by the monitoring system 100.

Furthermore, the data input or generated at the terminal device also includes the text data, as well as voice data, image data, etc. Even the voice data and the image data can be converted into the text data by a variety of recognition processing such as voice recognition and image recognition. The monitoring system 100 is intended to process not only the data that is originally text data, but also the data that is converted into text data. The conversion from the voice data and the image data into the text data may be executed in the monitoring system 100, or may be executed outside of the monitoring system 100.

<<Configuration of Monitoring System 100>>

The monitoring system 100 has a central processing unit (CPU), a random access memory (RAM), a read only memory (ROM), an input/output interface (I/O), and an external storage device. These operate in accordance with a predetermined program so as to configure a field-of-censorship generation device, a monitoring information extraction device, a candidate space generation device, etc.

<<Conversion Device>>

The monitoring system 100 has the input/output interface (I/O). The monitoring system 100 is connected to the network 10 via the input/output interface (I/O). The monitoring system 100 collects a variety of data via the network 10. A conversion device does not process text data if the collected data is text data. In contrast, the conversion device selects recognition processing in accordance with data format and converts the data into text data if the collected data is voice data or image data. In addition, as described above, the conversion of data may be executed in the monitoring system 100, or may be executed outside of the monitoring system 100.

In this way, the text data addressed in the monitoring system 100 of the present embodiment includes the data that is originally text data without undergoing the processing by the conversion device, and the data that is converted into text data by the conversion device. Those data are hereinafter referred to as text data for processing. The text data for processing includes a variety of words of interest such as a person, an article, a name of place, etc.

<<Association of Text Data for Processing>>

As described above, the server 20 stores both the creator identification data and the date/time data so that the monitoring system 100 can read out the data. The creator identification data and the date/time data are associated with the text data for processing. This makes it possible to execute a search using a creator who has created the text data for processing and date and time of creation of the text data for processing.

<<Abstraction of Personal Data>>

The text data for processing is input or generated by a diversity of individual persons. Accordingly, the text data for processing may contain a variety of personal information. In terms of protecting personal information, the monitoring system 100 of the present embodiment executes the process of abstracting personal information from the text data for processing. For example, a personal name by which an individual person is identified, and address, telephone number and e-mail address of the individual person are determined, and then they are abstracted from the text data for processing to process the text data for processing.

<<Generation of Related Terminology>>

The text data for processing is data indicating a variety of objects expressed by a creator. For example, the object shows a concept over a variety of fields such as famous person, food, cars, music, travel, etc. In order to induce the data to indicate the object, the processing is executed in which the text data for processing is divided into unit data composed of minimum character strings having a predetermined meaning. For example, the text data for processing can be decomposed into unit data of morpheme by being subjected to a morphological analysis. In addition, the processing of dividing into the data indicating the object is not limited to the morphological analysis, but may be the processing of separating from the text data for processing to data of a desired character string.

The text data for processing is associated with the creator identification data and the date/time data. Therefore, the creator identification data and the date/time data associated with the text data for processing can be associated with the character string data indicating the object as they are.

As described above, the object is the concept such as famous persons, food, cars, music, travel, etc. Accordingly, there exists a related object in relation to the object, such as a synonym, an equivalent word, slang, etc. In order to prevent the omission of search, at least data indicating a related object is added to data indicating a single object. For example, using a predetermined thesaurus makes it possible to derive the related object in relation thereto, such as a synonym, an equivalent word, slang, etc.

Figure 5:
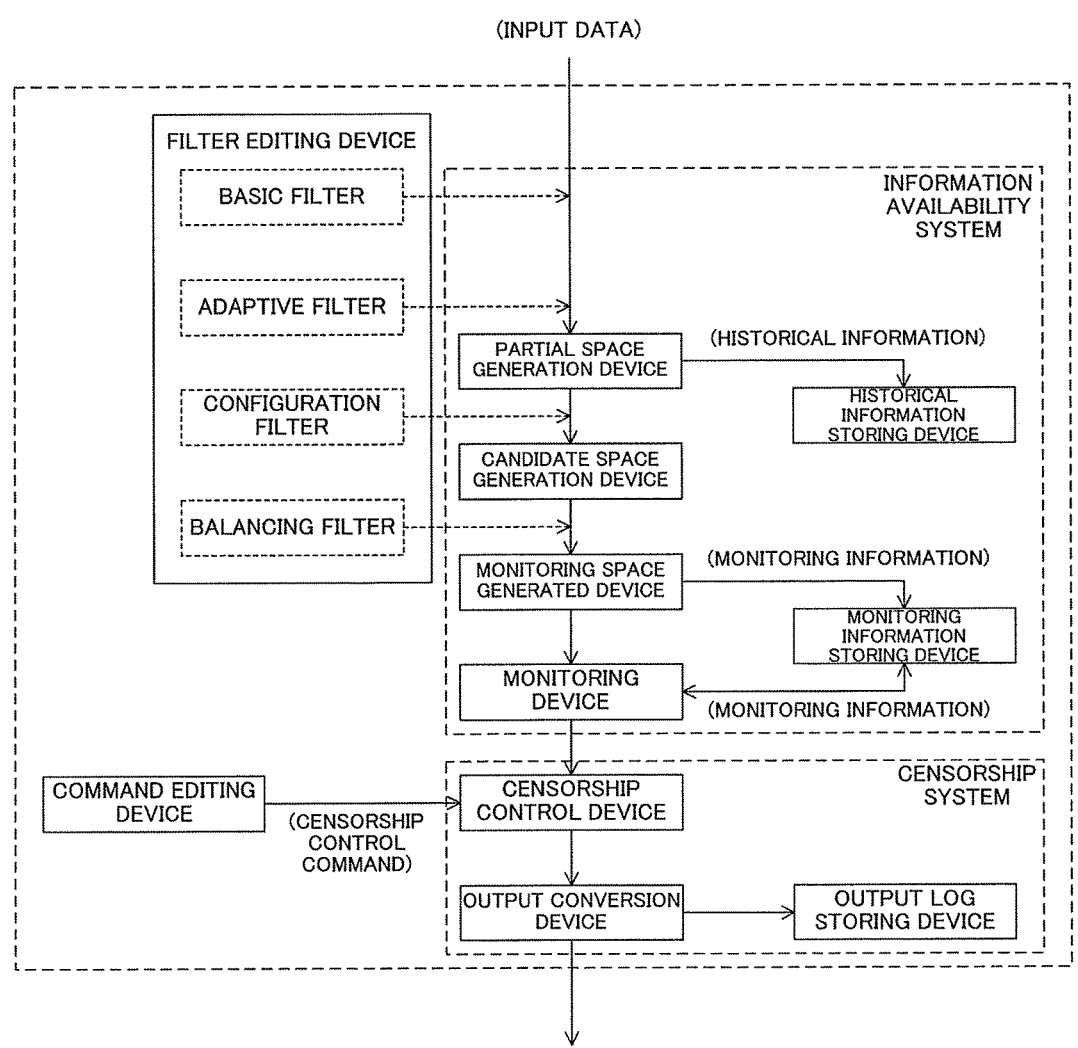
FIG. 5 is a block diagram showing an overview of the preference availability system and the censorship system according to the present embodiment.

The preference availability system and the censorship system will be described more specifically with reference to FIG. 5.

<First Stage>

As a first state, an abstraction program is executed, so that various expressions to be input (text data) is processed to be a related terminology (which is a plurality of decomposed text data that can identify the meaning converted into a predefined related text data) composed of a plurality of categories such as genre, preference, dialect or feeling, etc. The process processing is preprocessing for the process of analyzing whether or not there exists in a group of related terminologies a previously prepared particular related terminology that is desired to be monitored. Executing the process processing makes it possible to avoid the problem of leak of personal information even if the group of related terminology itself is leaked to the outside.

The text data described above is input from outside via an input interface. The person (hereinafter referred to as a censor) to be an object of the censorship regarding a related terminology as "a predetermined individual person" who has input the text data can be identified by a user ID. The user ID and the related terminology are linked to each other to be addressed as a pair.

The related terminology includes, for example, (1) a term which expresses itself as being clearly an object to be censored; (2) a term which can be recognized by people who is interested therein as being an object to be censored; and (3) a slang which can be recognized by experts as being an object to be censored. Therefore, it is different from the censorship which extracts and identifies only a user who transmits a predetermined word, such as a hazardous word and a certain terminology, as in the conventional manner.

For example, a person who is interested in a certain singer may input compatibility with the singer, and a person who is interested in cars may refer to a hybrid car and an electric car by using expressions such as "an article suitable for energy-saving" and "ecology". Therefore, when a computer executes the replacement while linking "an article suitable for energy-saving" to the related terminology, the word is replaced with "hybrid" or "electricity" so that the field of censorship is generated thanks to a first filtering processing (corresponding to, for example, the basic filter). The generation of the field of censorship is preprocessing of the following filtering for generating a partial space and a monitoring space.

Moreover, as in the aforementioned (1) to (3), since the related terminology to be replaced is composed of a different plurality of filters (basic filters) in a different slang level, the domains as many as the number of those basic filters are resultingly generated. The basic filters at different slang levels are updated, so that it is possible to render the filter suitable for the case where the person to be an object to be censored regarding the related terminology is a person who is familiar with certain industry, and to render the filter unique to and suitable for an operator who operates the censorship system (domain terminology). The flexibility in designing of the censorship system can be higher so as to provide the system which can be easy to operate.

The domain is defined for each basic filter described above.

Furthermore, in the case where the domain is generated with raw text data as it is, the leakage of personal information to the outside without approval of the person in question may cause a legal problem. In such a case, a plurality of filters at different slang levels is used to abstract the personal information and to converted the data into the related terminology described above, so that it is possible to avoid the problem of excluding the data from the object to be censored.

In the domain, the censor and the related terminology are linked to each other in that space, similar to a partial space, a candidate space, and a monitoring space generated below.

<Second Stage>

Next, a second filtering processing is performed as a second stage on the domain generated at the first stage, and thus a partial space corresponding to each of the second filtering processing is generated. Since the linkage of the censor with the related terminology is maintained also in the second filtering processing, the censor and the related terminology are linked with each other even in the partial space generated by the second filtering processing. While the censor and the related terminology are addressed as a pair, the second filtering processing is executed which is applicable to each of a plurality of kinds of genres previously prepared. A plurality of kinds of filters for the second filtering processing may enormous numbers of filters such as hundreds and thousands.

More specifically, the filter for "the second filtering processing which is applicable to each of a plurality of kinds of genres previously prepared" may be a slang filter, a classification filter, or a mentality filter. For example, the domain is filtered regarding whether or not a certain single slang is used.

For example, in the case where the domain is a space which is generated based on the contents of a web bulletin board for being posted by students of a school, the second filtering processing is performed by means of a single slang filter with regard to a related terminology of "annoying" as a certain slang, it is possible to extract a series of related text data groups to which the user ID corresponding to the related terminology is linked. In this case, the related terminology in relation to bullying may be extracted.

Moreover, when the second filtering is performed by means of the related terminology showing a certain mentality, the user ID in relation to the mentality and a series of other related terminologies (other related text data) in which the related terminology concerned appears are extracted in the domain to generated a partial space. Since there are various expressions as slang depending on districts, local communities and industries, it is desirable that the design is made so that the setting can be done at the side of the operator who operates the censorship system.

Furthermore, the setting may be done so that a single related terminology is assigned to a plurality of decomposed text data capable of identifying the meaning of the text data input from outside. The configuration in this manner makes it possible to monitor the pieces of decomposed text data having similar meaning that is expressed in various ways by means of a single related terminology. In this case, it is just necessary to be configured so that a lookup table and the like for assigning a single terminology to the decomposed text data is referred to.

Furthermore, in the case of monitoring newly input external information in real time, it is possible to perform the monitoring regarding whether or not the external information which is expressed in many ways corresponds to the related terminology as the monitoring information to be monitored, over a range broader than the external information. In contrast, the related terminology which is frequently used by the user ID to be monitored is regarded as the object to be monitored as the new particular related terminology, so that it is possible to easily monitor the change moving with time.

The historical information is generated from the partial space generated by the second filtering processing, and stored in a historical information database. The historical information is information which can designate the domain constituting the partial space and designate the type of adaptive filter for use in the second filtering processing, and characterize the domain to determine what type of related terminology is contained.

Furthermore, an output interface can be provided in order to output information in the historical database to the external information availability device. The information availability device includes, for example, ones which visually displays, in a tabular form, date and time in which an external input is done, a user ID for identifying an individual person who has input the external information, and the related terminology group converted from the external information, those being expressed by character strings, or ones for visually displaying as a bar chart and a curve graph on a display.

<Third Stage>

Furthermore, a third filtering processing as a third stage is executed on the partial space generated at the second stage. The third filtering processing is the filtering processing suitable for determining whether or not it is in the particular situation with regard to the related terminology contained in the partial space. Specifically, the determination process is executed regarding whether or not a predetermined particular condition is satisfied for each related terminology at a certain different monitoring level, and the related terminology satisfying the particular condition is extracted as a candidate space. The extracted candidate space contains the related text data for each user ID.

"Whether or not a particular condition is satisfied" is that the filtering is performed by a predefined determination in which, if "drag", "murder", "bullying", "suicide", "nuclear bomb", and "super yummy" which are set at the hazardous level in the slang level appears even once, "pleasant", "nuclear", "disgusting", "yummy" frequently appear (such as ten times) in a series of external information.

<Fourth Stage>

In addition, a fourth filtering process program is executed as a fourth stage in which it is determined whether or not the user ID of an object of candidate described above from the historical information based on the input date/time data described above in the candidate space, and the setting in the monitoring space is determined based on the candidate space containing the particular factor described above of the user ID set as the object to be monitored, as well as the related text data group in other partial space with the different input date/time data of the user ID similar to the above. Then, the related text data which has been set in the monitoring space described above and the user ID to be an object of monitoring are regarded as the monitoring information described above, and are stored in a database retrievably for the following monitoring. "Stored in a database retrievably for the following monitoring" is that, in the case where a monitoring information database which stores the monitoring information is connected to the monitoring device and an external information is the external information from the user ID of the object to be monitored when input from the outside, a censorship command in relation thereto is output to the outside, whereas, if not the user ID of the object to be monitored, the censorship command in relation thereto is output to the outside when there exists a partial space containing the related terminology as being a particular factor used by the object to be monitored.

<<Details of Censorship System According to the Present Embodiment>>

<<Censorship>>

The censorship system according to the present embodiment generates a concept of censorship in which a field formed by a user of the main system is regarded as a field of censorship. Therefore, the censorship in the censorship system according to the present embodiment is characterized by function and service offered by the censorship system, in contrast to a simple censorship.

The censorship system according to the present embodiment may not only find and monitor an individual person who transmits antisocialistic information and information counter to common sense, but also find an individual person who is suffered for psychological and/or mental instability and an individual person who feel pain through the transmission of information so as to take an appropriate action for protecting them. In this way, the censorship system according to the present embodiment is the system capable of addressing individual persons including their psychological status and mental status.

<<Transmission of Information>>

In the present embodiment, transmission of information refers to writing various information in mainly e-mail, SMS, blog, Twitter, an input box on the web screen, a bulletin board, etc. The contents of the transmitted information are the object to be censored in the censorship system according to the present embodiment. The censorship system of the present embodiment acquires information written in e-mail, SMS, blog, Twitter, an input box on the web screen, a bulletin board, etc., to analyze the contents of the transmitted information. The information written in e-mail, SMS, blog, Twitter, an input box on the web screen, a bulletin board, etc., is mainly in text data format.

In addition, the censorship system of the present embodiment addresses the data as the transmitted information and regards it as the object to be censored even though it is in the voice or image format, as long as the data is one that can be converted into text data. For example, the data may be in a variety of formats such as voice data and image data as long as it can be converted into text data by executing the recognition processing. The censorship system of the present embodiment analyses the contents using the converted text data so as to be an object to be censored as the transmitted information.

The transmitted information corresponds to "an individual person generated data generated by an individual person" and "text data based on the individual person generated data generated by an individual person".

<<Personal Information>>

Personal information to be an object in the present embodiment is information which can identify an individual person by the information itself, such as name and address. In contrast, in the case where the individual person cannot be identified only by the information in question and the individual person can be identified by referring to other information, the information is not addressed as personal information. The censorship system of the present embodiment abstracts and addresses the personal information contained in the contents of information transmitted by an individual person.

<<Related Terminology>>

The censorship system according to the present embodiment is configured on the basis of keywords called related terminology, and function and service provided by the censorship system are achieved based on related information held in the related terminology. Therefore, the related terminology is different from so-called keywords for use in a usual search processing and the like. The related terminology is different from simply keywords, and can link a variety of information such as domain and preference with each other in order to configure information such as historical information and monitoring information described below.

The related terminology includes data for expressing a predetermined object contained in the contents of the transmitted information. The object contained in the transmitted information is, for example, a specific and substantive article and an abstract concept which an individual person wishes to express by transmitting information.

The related terminology corresponds to "related text data".

<<Unique ID (User ID)>>

A unique ID is information for identifying an individual person who has transmitted information. The censorship system manages the unique ID in connection to the contents of transmitted information as the related terminology. The unique ID is not personal information itself. The unique ID includes, for example, telephone number, license number, IP address, handle name in a bulletin board, etc. An individual person can be identified by means of the unique ID by referring to other information. Therefore, the personal information is never leaked form the censorship system to the outside, and an operator of the censorship system can identify an individual person using the unique ID.

<<Date/Time Information>>

Date/time information is information indicating the time of transmission of information by an individual person, such as year/month/day and hour/minute/second, etc. The censorship system manages the date/time information in connection to the contents of transmitted information as the related terminology, similar to the unique ID. In addition, all of the information of year/month/day and hour/minute/second is not necessarily used, and it is just necessary to appropriately select and use the information desired by an operator of the censorship system. For example, the date/time information can be acquired form date/time of transmission of e-mail, date/time at the time when the information has posted to the bulletin board.

<<Domain>>

The censorship system according to the present embodiment extracts the related terminology indicating a predetermined object which is desired by an operator of the censorship system from the contents of information transmitted by an individual person, and regards the related terminology as an object to be censored. In order to extract the related terminology indicating a predetermined object from the contents of information transmitted by an individual person, the censorship system initially uses the basic filter.

Furthermore, the censorship system of the present embodiment regards both the related terminology indicating a predetermined object contained in the contents of information transmitted by an individual person and the related terminology indicating a related object in relation to the predetermined object, as the object to be censored. As described above, the predetermined object is, for example, a specific and substantive article and an abstract concept which an individual person wishes to express by transmitting information. Moreover, the related object is an object which is expanded from the predetermined object by using a synonym, a same meaning word, an equivalent meaning word, an association word, a related word, as well as a slang which indicate the predetermined object. Both the related terminology indicating the predetermined object and the related terminology indicating the related object expanded from the predetermined object are used to be regarded as the objects of censorship.

The basic filter for use in the censorship system according to the present embodiment is the filter for extracting both the related terminology indicating a predetermined object desired by an operator of the censorship system and the related terminology indicating the related object in relation to the predetermined object. Using the basic filter makes it possible to extract both the related terminology indicating the predetermined object and the related terminology indicating the related object so as to be the objects to be censored. This makes it possible to regard a synonym, slang and the like as the object to be censored, and thus the censorship which is desired by an operator of the censorship system can be achieved adequately.

In order to achieve the expansion from the predetermined object to the related object, the basic filter may be configured using a so-called thesaurus that is commonly available. Furthermore, the basic filter may be configured using a thesaurus which is accumulated and made by an operator of the censorship system on his/her own accord. The censorship system is configured so that an operator of the censorship system can appropriately change the basic filter, and thus the related object can be expanded to the range desired by an operator of the censorship system, thereby achieving more adequate censorship.

At least one basic filter can be set. Both the related terminology indicating the predetermined object and the related terminology indicating the related object are extracted from the contents of information transmitted by an individual person using a single basic filter, so that a single domain can be formed. The single domain is the region of collection including the related terminology indicating the predetermined object extracted by the basic filter and the related terminology indicating the related object. When a plurality of basic filters is set, the domain is formed corresponding to each thereof. This makes it possible to extract the related terminology indicating a variety of predetermined objects and the related terminology indicating the related object, and thus the censorship can be executed more reliably.

Filters for classifying the related terminology for each of a plurality of types can be defined as a plurality of basic filters. This makes it possible to classify and extract the keywords (related terminologies) indicating a variety of objects contained in the contents of information transmitted by an individual person for each of the plurality of types, thereby forming the domain in accordance with the extracted related terminology. For example, the predetermined type includes a predetermined genre, theme, category, etc.

FIG. 3(a) is a diagram showing an example of a partial space and a field of censorship. In the field of censorship shown in FIG. 3(a), one cell means one partial space. The partial space will be described below. The field of censorship shown in FIG. 3(a) is composed of four domains ($u_1$ to $u_4$) formed of four basic filters. As shown in FIG. 3(a), the domain is used for indicating a plurality of basic filters (related conditions). Specifically, a first basic filter corresponds to a first domain (i=1), a second basic filter corresponds to a second domain (i=2), a third basic filter corresponds to a third domain (i=3), and a fourth basic filter corresponds to a fourth domain (i=4). In this way, the domain is for classifying and identifying the plurality of basic filters.

The first basic filter generates a domain ($u_1$). The first domain is a region of collection that is formed by the related terminology extracted in accordance with the setting condition of the first basic filter from the related terminology indicating the predetermined object contained in the contents of information transmitted by an individual person and the related terminology indicating the related object. Likewise, a second domain ($u_2$) is a region of collection formed by the related terminology indicating the predetermined object and the related terminology indicating the related object that are extracted in accordance with the setting condition of the second basic filter, a third domain ($u_3$) is a region of collection formed by the related terminology indicating the predetermined object and the related terminology indicating the related object that are extracted in accordance with the setting condition of the third basic filter, a fourth domain ($u_4$) is a region of collection formed by the related terminology indicating the predetermined object and the related terminology indicating the related object that are extracted in accordance with the setting condition of the fourth basic filter. The domains are formed in this manner, so that each of the domains contains at least one related terminology indicating the predetermined object or related object.

<<Preference>>

The censorship system of the present embodiment censors the contents of information transmitted by an individual person including feeling thereof. In general, an individual person may transmits information having good feeling about a predetermined object or having bad feeling thereabout when transmitting information on the predetermined object. For example, information on a certain product may be transmitted with feeling of dissatisfaction about the product, e.g., he/she never desires to purchase or use it, or with feeling of satisfaction, e.g., he/she would love to purchase it.

Therefore, even if the individual person transmits information on the same object, a simple keyword search may provide search results including both one serving as a useful reference and one serving as an unuseful reference. In terms of such the status, it is facilitated that feeling about the predetermined object can be acquired form the contents of transmitted information so that the feeling itself also can be the object to be censored.

The censorship system of the present embodiment addresses the feeling about the predetermined object as preference regarding the predetermined object. The preference is acquired by extracting a word indicating a predetermined object, adjective, adverb, verb, etc., from the contents of information transmitted by an individual person, more specifically from text data such as e-mail, SMS, blog, Twitter, an input box on the web screen, a bulletin board, etc., and classifying those adjective, adverb and verb to analyze the preference regarding a predetermined object. A level of feeling about the predetermined object is also analyzed at that time. For example, the level of feeling is included to be addressed as the preference, such as having very good feeling, having good feeling to some extent, having not so good feeling, having very bad feeling, etc. Furthermore, the number of times of expressing the feeling is also addressed as the preference. Specifically, the facts of offering compliments on the product many times or speaking ill of the product many times, and transmitting information only once are addressed as the preference.

The preference is not only limited to the expression based on feeling, but also includes the expression based on mentality. Specifically, the preference is a characteristic that is objectively expressed based on feeling and mentality about a predetermined object contained in information transmitted by an individual person. In other words, the preference is what an individual person feels, considers, and thinks regarding a predetermined object. The preference is just necessary to be an objective expression which can be extracted from text data such as e-mail, SMS, blog, Twitter, an input box on the web screen, a bulletin board, etc. The preference is designed to be characteristically parameterized based on the text data, and then addressed computably as numerical values.

The censorship system of the present embodiment uses an adaptive filter for extracting preference regarding a predetermined object from the contents of information transmitted by an individual person. At least one adaptive filter can be set. The preference regarding the predetermined object can be extracted from the contents of information transmitted by an individual person using a single adaptive filter. A single preference indicates the preference that is extracted by a single adaptive filter, and also the preference regarding the predetermined object. When a plurality of adaptive filters is set, the preference is extracted for each thereof. This makes it possible to extract a variety of preferences regarding a predetermined object including feeling and mental status toward the predetermined object.

As described above, FIG. 3(a) is a diagram showing an example of a partial space and a field of censorship. In the field of censorship shown in FIG. 3(a), one cell means one partial space. The partial space will be described below. The field of censorship is a space composed of collection of text data which is acquired form the contents of information transmitted by an individual person so as to be an object to be censored, for example. More specifically, the field of censorship is composed of at least one text data to be an object to be censored, and is composed the collection of a plurality of pieces of text data if any. The field of censorship is, for example, a space (plane) having an axis of preference as the lateral axis and an axis of domain as the vertical axis, as shown in FIG. 3(a). Furthermore, the field of censorship can be the space having an axis of time in addition to the axis of preference and the axis of domain, as shown in FIG. 3(b).

As described above, the field of censorship is a space composed of collection of text data to be an object to be censored. The collection is not necessarily a concept of set for use in mathematics, but is just necessary to be formed by collecting text data. Moreover, identical text data may constitute a plurality of collections. For example, the field of censorship may be configured by constituting first and second collections by identical text data. Furthermore, for example, a single collection can constitute a single partial space.

The field of censorship shown in FIG. 3(a) has five preferences (j=1 to 5) corresponding to each of five adaptive filters. As shown in FIG. 3(a), the preferences for indicating a plurality of adaptive filters (characteristic conditions) are used. More specifically, a first adaptive filter corresponds to a first preference (j=1), a second adaptive filter corresponds to a second preference (j=2), a third adaptive filter corresponds to a third preference (j=3), a fourth adaptive filter corresponds to a fourth preference (j=4), and a fifth adaptive filter corresponds to a fifth preference (j=5). In this way, the adaptive filter is for classifying and identifying a plurality of preferences.

The partial space contained in the first preference is the region of collection formed by the preference extracted in accordance with the setting condition of the first adaptive filter from various preferences regarding the predetermined object contained in the contents of information transmitted by an individual person and regarding the related object. Likewise, the partial space contained in the second preference (j=2) is a region of collection formed by the preferences regarding the predetermined object and the related object in accordance with the setting condition of the second adaptive filter, the partial space contained in the third preference (j=3) is a region of collection formed by the preferences regarding the predetermined object and the related object in accordance with the setting condition of the third adaptive filter, the partial space contained in the fourth preference (j=4) is a region of collection formed by the preferences regarding the predetermined object and the related object in accordance with the setting condition of the fourth adaptive filter, and the partial space contained in the fifth preference (j=5) is a region of collection formed by the preferences regarding the predetermined object and the related object in accordance with the setting condition of the fifth adaptive filter, As described above, in the field of censorship shown in FIG. 3(a), one cell means one partial space. As described below, the domain is generated by the basic filter, and the partial space is generated by extracting from the domain by means of the adaptive filter.

<<Basic Filter, Adaptive Filter, Partial Space>>

Figure 6:
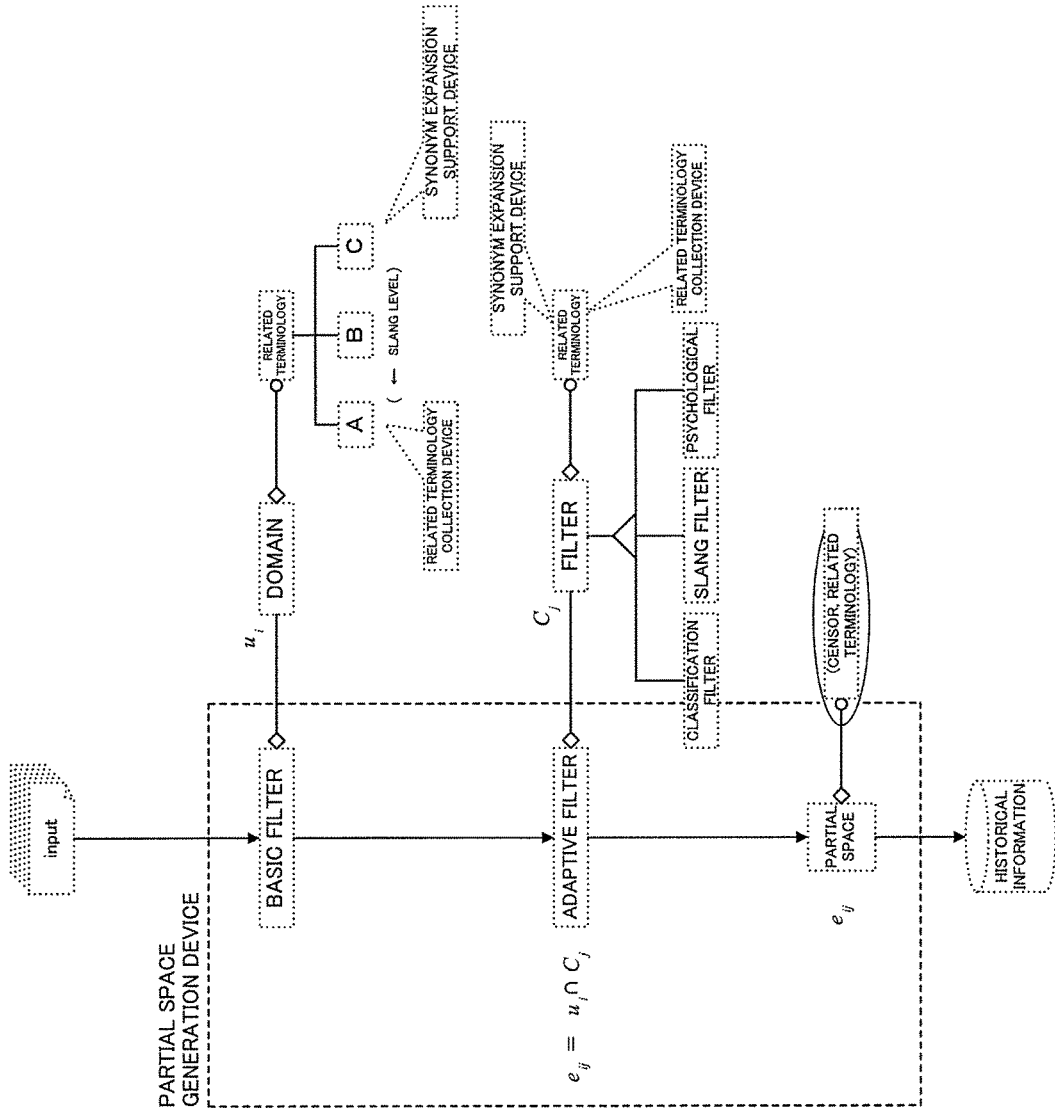
FIG. 6 is a block diagram showing an overview of a partial space generation device in the preference availability system and the censorship system according to the present embodiment.

FIG. 6 is a diagram showing an overview of the basic filter, the adaptive filter, and the partial space.

<Basic Filter>

The basic filter is a filter for extracting the related terminology out of information transmitted by an individual person which is to be an object to be censored by the censorship system according to the present embodiment. For example, the information transmitted by an individual person is a lot of accumulated personal data, as shown in FIG. 6. The personal data may be the data accumulated in a predetermined server, or the data collected and accumulated by the censorship system.

The basic filter can extract not only the related terminology indicating a predetermined object contained in the contents of information transmitted by an individual person, but also the related terminology indicating the related object in relation to the predetermined object. Using the basic filter makes it possible to include, as the object to be censored, the word which can be evoked by the object indicated by the related terminology and is in relation to the related terminology, a slang of the related terminology, a synonym of the related terminology, etc., in addition to a simple related terminology.

As shown in FIG. 6, the levels of slang of the related terminology constituting the basic filter can be set as follows: level A: the terminology which can be publicly understood as being clearly an object to be censored; level B: the terminology which can be understood by people who is interested in as being an object to be censored; and level C: a terminology which can be understood by a specialist of the related terminology as being an object to be censored. Furthermore, the slang can be made available by selecting the slang level. For example, even though the slang at level C is obscured by a bunch of existing slangs at level A, they can be made available to compare with one another.

The predetermined related terminology is extracted by the basic filter from information transmitted by an individual person, thereby generating the domain. Specifically, the predetermined related terminology is extracted by i-th basic filter from information transmitted by an individual person, thereby generating i-th domain $u_i$ by the extracted related terminology, as shown in FIG. 6. In the domain the extracted related terminology is linked with a person regarded as an object to be censored (hereinafter referred to as the censored). The censored is a person who is identified by the unique ID described above.

The domain $u_i$ is generated corresponding to the basic filter. As shown in FIG. 3(*a*), a plurality of domains $u_i$ can be generated from the information transmitted by an individual person by changing the basic filter to address.

The domain $u_i$ is generated by the basic filter in a partial space generation device. In the partial space generation device, an operator can set the basic filter, the related terminology specific to the operator can be extracted from information transmitted by an individual person, and the related terminology can be completely extracted from information transmitted by an individual person. The domain is a collection configured by the related terminologies (keywords). Furthermore, the domain is a space which links the extracted related terminology with the unique ID, and includes a collection of pairs of the related terminology to be an object to be censored and the censored while adjusting the slang level.

The related terminology may be collected by a related terminology collection device. Furthermore, a synonym such as slang can be expanded by a synonym expansion support device. The related terminology collection device and the synonym expansion support device are managed and operated by an operator so that the operator of the censorship system can execute the censorship as desired.

<Adaptive Filter>

The adaptive filter is a filter for extracting preference about a predetermined object from the contents of information transmitted by an individual person. As described above, the preference is a characteristic that is objectively expressed based on feeling and mentality about a predetermined object contained in information transmitted by an individual person. That is, the preference is what an individual person feels, considers, and thinks regarding a predetermined object. The preference is designed to be characteristically parameterized based on the text data, and then addressed computably as numerical values.

As shown in FIG. 6, the adaptive filter may be composed of a classification filter, a slang filter, and a mentality filter. The classification filter is a filter for classifying and extracting the preference about a predetermined object indicated by the related terminology. The slang filter is a filter for making it possible to extract the preference about a predetermined object even if it is expressed by slang. The mentality filter is a filter for making it possible to extract the expression based on mentality about a predetermined object.

The adaptive filter is composed of at least one of the classification filter, the slang filter and the mentality filter. When there is more than one kind of classification filter, the slang filter and the mentality filter, respectively, the combination thereof may constitute one adaptive filter. For example, the combination of the classification filter, the slang filter and the mentality filter constitute j-th adaptive filter $C_j$.

<Partial Space>

As described above, a domain $u_i$ is generated from information transmitted by an individual person in accordance with the basic filter. The j-th adaptive filter $C_j$ is used to the domain ui to calculate $u_i \cap C_j$, so that the related terminology satisfying the adaptive filter $C_j$ is extracted from the related terminology contained in the domain thereby generating a partial space by the extracted related terminology. The processing executed in this way results in the partial space $e_{ij}$ as being the collection composed of the related terminology that is extracted by both the basic filter (i-th domain) and the adaptive filter $C_j$ out of the related terminology contained in information transmitted by an individual person. Furthermore, the partial space is a space which links the extracted related terminology with the unique ID, and includes a collection of pairs of the related terminology to be an object to be censored and the censored, similar to the domain.

The partial space generation device generates the partial space $e_{ij}$ from the related terminology contained in the domain $u_i$ using the adaptive filter $C_j$. In the partial space generation device, an operator can set the adaptive filter, the preference specific to the operator can be extracted from information transmitted by an individual person, and the preference can be completely extracted from information transmitted by an individual person.

The basic filter corresponds to "the predetermined related condition". The adaptive filter corresponds to "the predetermined characteristic condition". The related terminology contained in the partial space corresponds to "the first extracted data" and "the characteristic text data".

<<Configuration Filter, Candidate Space>>

Figure 7:
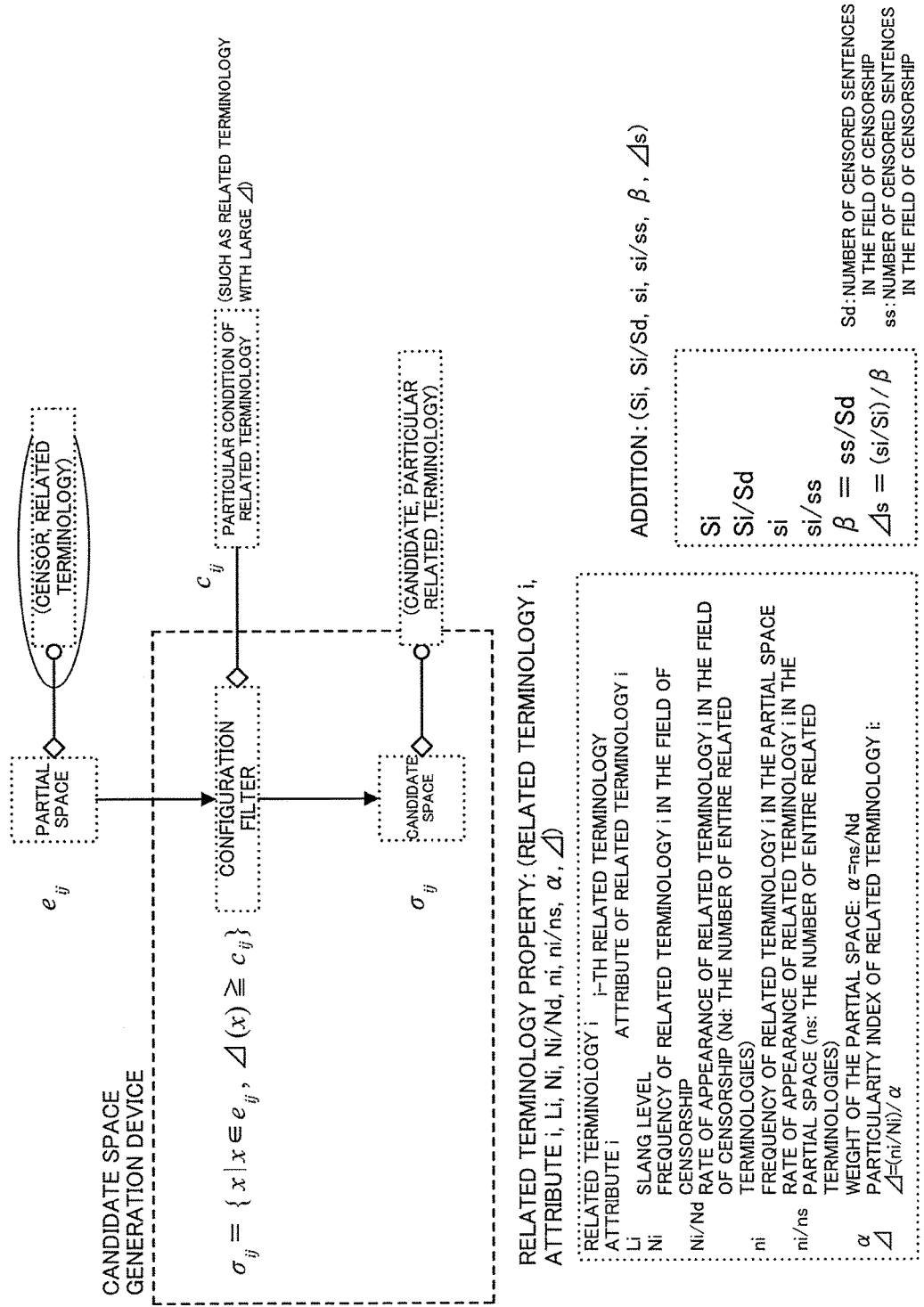
FIG. 7 is a block diagram showing an overview of a candidate space generation device in the preference availability system and the censorship system according to the present embodiment.

FIG. 7 is a diagram showing an overview of a configuration filter and a candidate space generation device.

The configuration filter is the filter for extracting the related terminology indicating particularity out of the related terminologies contained in the partial space $e_{ij}$. For example, the configuration filter is the filter for extracting the related terminology that satisfies the particular condition such as the fact that information on a predetermined object has been transmitted remarkably many times, transmission of information has been suddenly started since a certain point of time, or the like.

The partial space containing the related terminology that satisfies the particular condition is extracted out of the partial space extracted by the adaptive filter, and the candidate space is generated from the extracted partial space.

The particular condition can be represented by the condition based on various related terminology properties defined with regard to a pair x of the censored and the related terminology, as shown in FIG. 7.

The related terminology property includes, for example, an attribute i of i-th related terminology, a slang level Li of i-th related terminology, a frequency Ni in the field of censorship regarding i-th related terminology, a rate of appearance Ni/Nd in the field of censorship regarding i-th related terminology (Nd: the number of entire related terminologies), a frequency ni in the partial space regarding i-th related terminology, a rate of appearance ni/ns of related terminology i in the partial space (ns: the number of entire related terminologies), a weight of the partial space α (=ns/Nd), a particularity index of i-th related terminology $\Delta$ (=(ni/Ni)/α), etc.

Furthermore, it is possible to use Si, Si/Sd, si, si/ss, β=ss/Sd, and $\Delta$ s=(si/Si)/β as the particular conditions. These are parameters indicating cover rate in the partial space: Sd is the number of censored sentences in the field of censorship, and ss is the number of censored sentences in the partial space.

Using such a variety of related terminology properties makes it easy to find the related terminology which represents the particularity. The partial space containing the related terminology which represents the particularity is extracted to generate the candidate space. For example, the particularity in the partial space has the characteristic such as bias or skewness of the existence of related terminology in the partial space.

As shown in FIG. 7, the adaptive filter corresponding to the particular condition $c_{ij}$ of the related terminology is used to compute $\sigma_{ij}=\{x|x\epsilon e_{ij},\Delta(x)\geq c_{ij}\}$, so that the related terminology satisfying the particular condition $c_{ij}$ is extracted from the related terminology containing the partial space $e_{ij}$ generated by the adaptive filter, thereby generating the candidate space $\sigma_{ij}$ by the extracted terminology. The processing executed in this way results in the candidate space $\sigma_{ij}$ as being the collection composed of the related terminology that is extracted by three kinds of filters, i.e., the basic filter (i-th domain), the adaptive filter $C_j$, and the configuration filter, out of the related terminology contained in information transmitted by an individual person. Furthermore, the candidate space is a space which links the extracted related terminology with the unique ID, and includes a collection of pairs of the related terminology to be an object to be censored and the censored, similar to the partial space. The censored is a person who is identified by the unique ID described above.

The candidate space generation device generates the candidate space from the related terminology contained in the partial space $e_{ij}$ using the related terminology satisfying the particular condition $c_{ij}$ using the adaptive filter $C_j$. In the candidate space generation device, the particularity property of the related terminology can be defined for each domain and preference designated by the operator side, so that it is possible to extract the censored and the related terminology which lead directly to the service at the operator side. The related terminology extracted using the configuration filter is referred to as a particular related terminology. Furthermore, the censored who is linked with the related terminology extracted using the configuration filter is referred to as the candidate (a person who should be monitored).

The adaptive filter corresponds to "the particular condition indicating a predetermined particularity". The related terminology contained in the candidate space corresponds to "the particular related text data".

<<Balancing Filter, Monitoring Space>>

Figure 8:
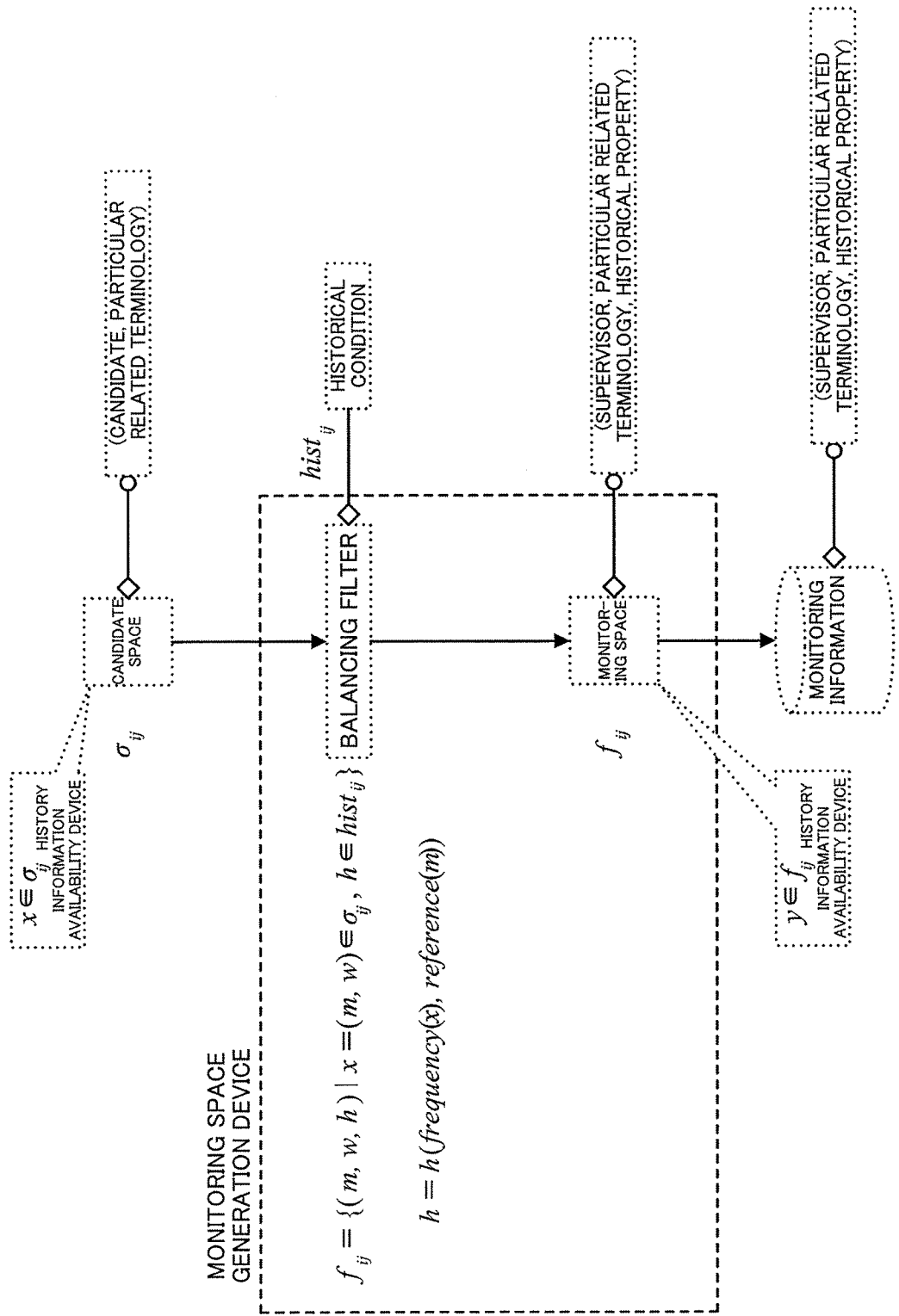
FIG. 8 is a block diagram showing an overview of a monitoring space generation device in the preference availability system and the censorship system according to the present embodiment.

FIG. 8 is a diagram showing an overview of the balancing filter and the monitoring space generation device.

The balancing filter is the filter for extracting the related terminology satisfying a predetermined historical condition and generating a monitoring space. The historical condition is the condition in relation to the related terminology. For example, the historical condition is the condition which can be defined from the history regarding the related terminology which is always in information transmitted by a certain individual person, the related terminology which is in information transmitted by a certain individual person for the first time, or the related terminology which is in information currently transmitted and talked by many individual persons. Executing a variety of statistical processing with regard to the related terminology makes it possible to determine whether or not the historical condition is satisfied.

For example, the balancing filter corresponding to a historical condition $hist_{ij}$ regarding the related terminology is used to compute $f_{ij}=\{(m,w,h)|x=(m,w)\epsilon\sigma_{ij},h\epsilon hist_{ij}\}$, so that the related terminology satisfying the historical condition $hist_{ij}$ is extracted from the related terminology contained in the candidate space $\sigma_{ij}$ generated by the configuration filter, thereby generating the monitoring space $f_{ij}$ by the extracted related terminology; where h=h(frequency(x), reference(m)). The processing executed in this way results in the monitoring space $f_{ij}$ as being the collection composed of the related terminologies that are extracted by four kinds of filters, i.e., the basic filter (i-th domain), the adaptive filter $C_j$, the configuration filter, and the balancing filter out of the related terminology contained in information transmitted by an individual person. Furthermore, the monitoring space is a space which links the extracted related terminology with the unique ID, and includes a collection of pairs of the related terminology to be an object to be censored and the censored, similar to the partial space and the candidate space. The censored is a person who is identified by the unique ID described above.

The monitoring space generation device generates the monitoring space $f_{ij}$ from the related terminology contained in the candidate space $\sigma_{ij}$ using the related terminology satisfying the historical condition $hist_{ij}$ using the balancing filter. In the monitoring space generation device, the historical condition can be defined for each domain and preference designated by the operator side, so that it is possible to extract the censored and the particular related terminology which lead directly to the service at the operator side.

Figure 9:
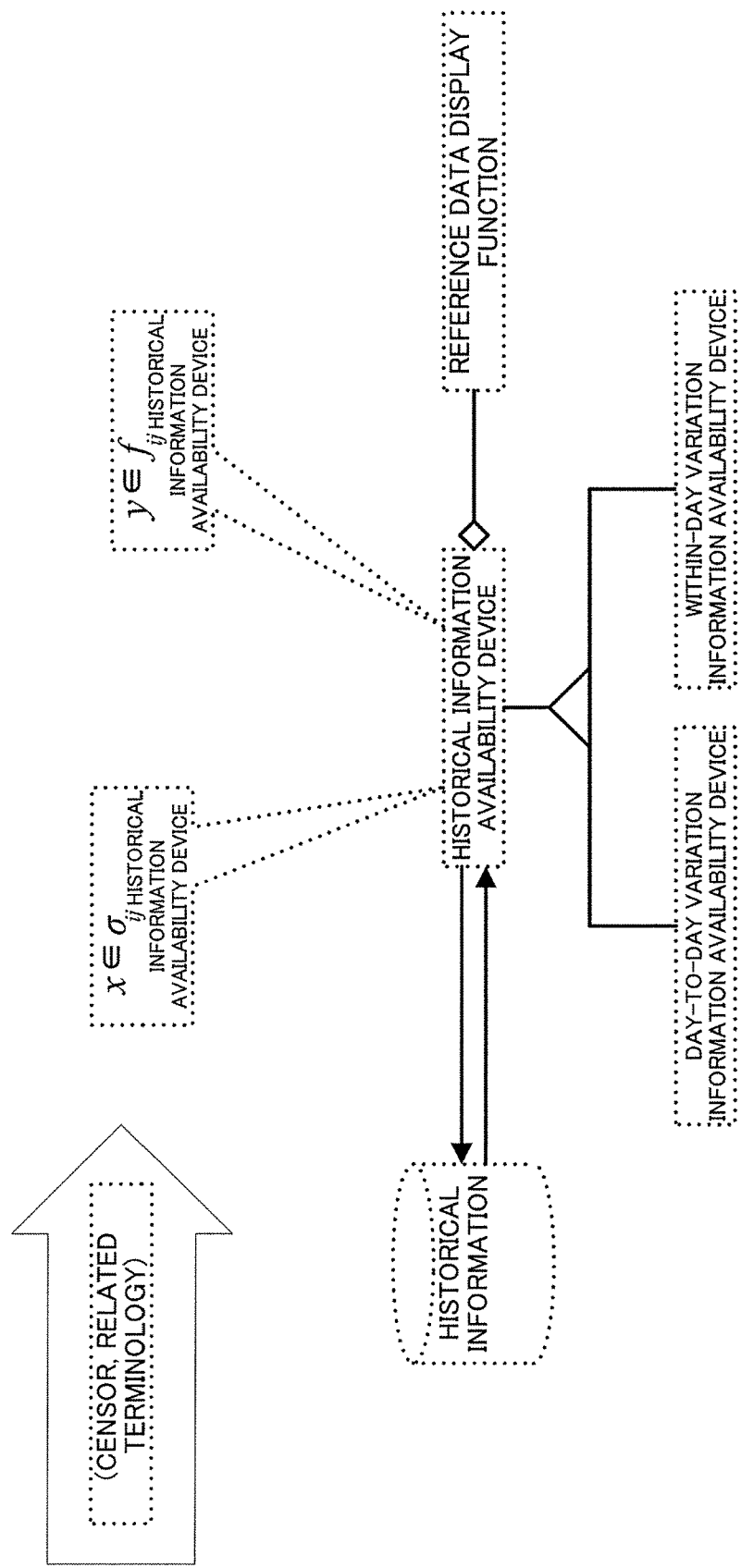
FIG. 9 is a block diagram showing an overview of a historical space generation device in the preference availability system and the censorship system according to the present embodiment.

As shown in FIGS. 8 and 9, the historical availability device of $x\epsilon\sigma_{ij}$ can be configured with regard to the candidate space and the historical availability device of $y\epsilon f_{ij}$ can be configured with regard to the monitoring space $f_{ij}$. The historical availability devices of these types are configured, so that it is possible to configure a day-to-day variation information availability device for indicating the day-to-day variation and a within-day variation information availability device for indicating the variation within a day. A variety of data thus can be displayed.

For example, acquiring such the historical property makes it possible to detect the partial space in which the particularity changes in with time of day, as shown in FIG. 3(b). Therefore, it is possible to detect the partial space in which the information is not only one that is currently transmitted or transmitted at a certain time of day in the past, but also one that the contents thereof gradually changes and suddenly changes. An individual person who transmitted information in the same way can be an object to be censored. Furthermore, the estimation in future can be done by the change in time of day, and thus it can be determined whether or not it should be monitored from this time forward.

The balancing filter corresponds to "the predetermined historical condition". The related terminology contained in the candidate space corresponds to "the historical text data".

<<<Censorship System Available Online>>>

Figure 10:
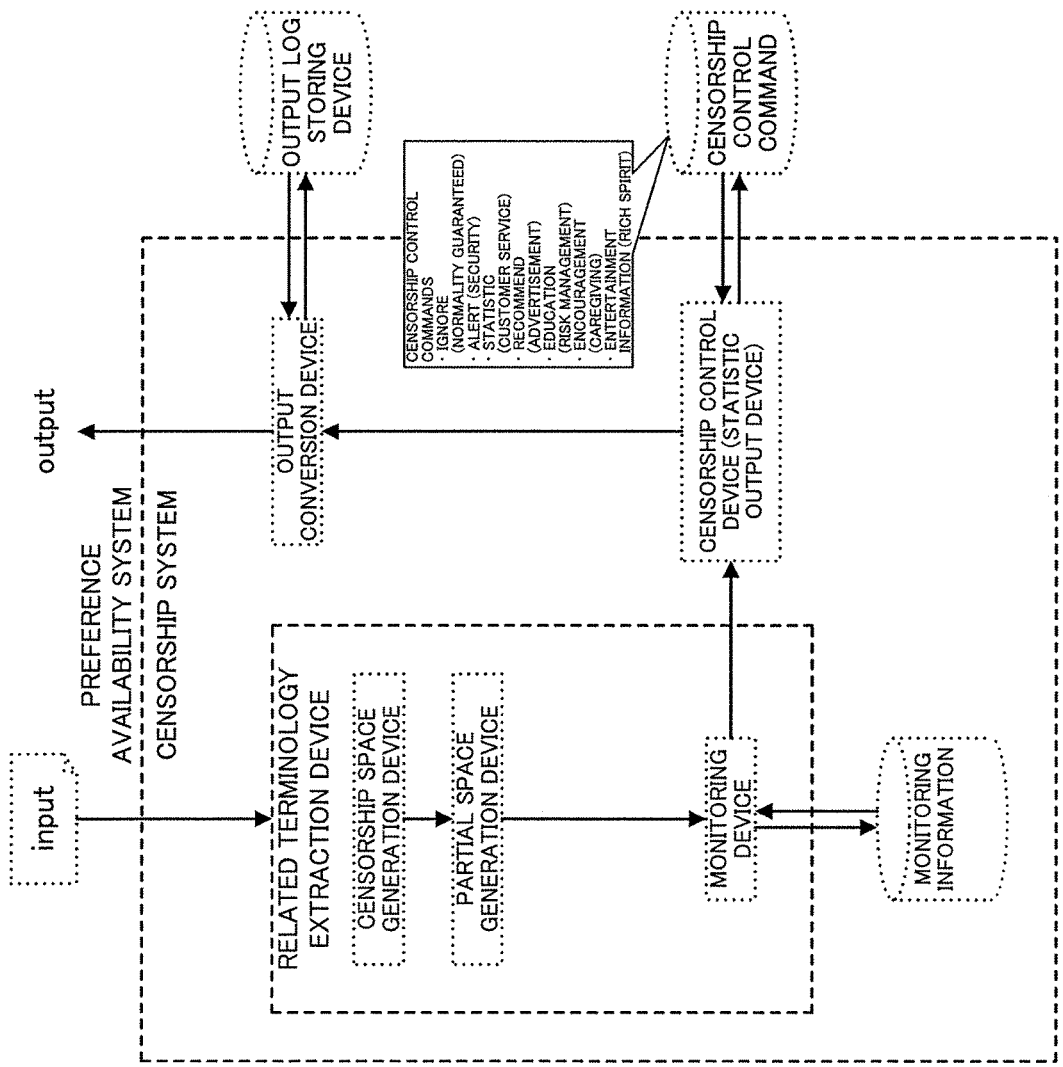
FIG. 10 is a block diagram showing an overview of a preference availability system (censorship system) available online.

FIG. 10 is a block diagram showing an overview of a preference availability system (censorship system) available online.

A related terminology extraction device shown in FIG. 10 is composed of the partial space generation device described above (refer to FIG. 11). The partial space generation device executes the processing in the same way as described above. More specifically, the domain $u_i$ is generated from information transmitted by an individual person by the basic filter, and the partial space $e_{ij}$ is generated from the domain $u_i$ by the adaptive filter.

Figure 12:
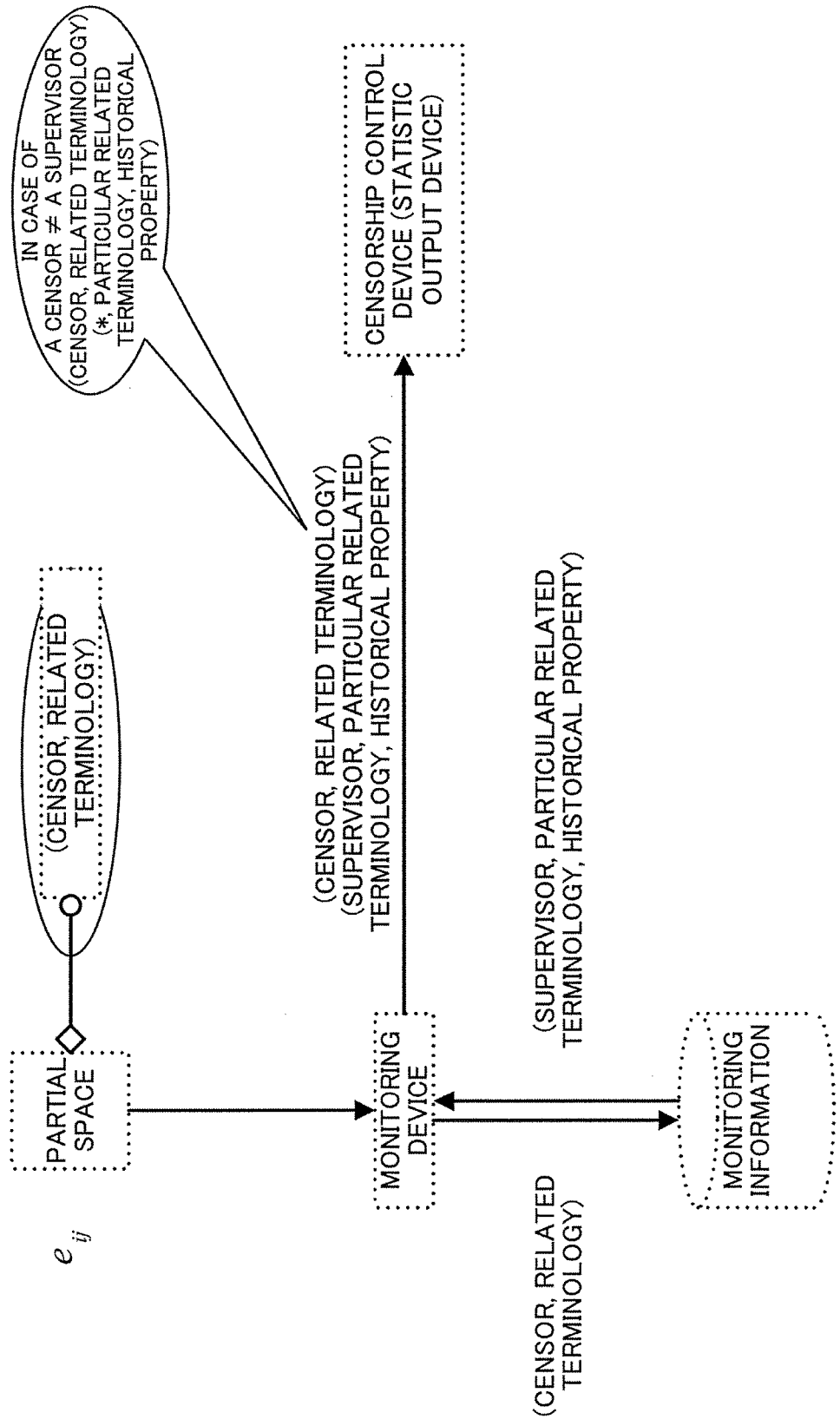
FIG. 12 is a block diagram showing an overview of a monitoring device in a preference availability system and a censorship system according to the present embodiment.

Furthermore, the related terminology extraction device has a monitoring device (refer to FIG. 12). The monitoring device refers to monitoring information based on the related terminology contained in the partial space and the unique ID (the censored) so as to acquire the censored to be monitored (the monitored), the related terminology in which the particularity has been found (a particular related terminology), and a historical property regarding the particular related terminology, from the monitoring information. The monitoring device outputs the acquired monitored, particular related terminology, and historical property to a censorship control device. In addition, in the case where information such as advertisement of a new product is provided to a plurality of individual persons, the censored may not be the monitored. In this case, the monitoring device outputs the censored and the related terminology to the censorship control device.

Figure 13:
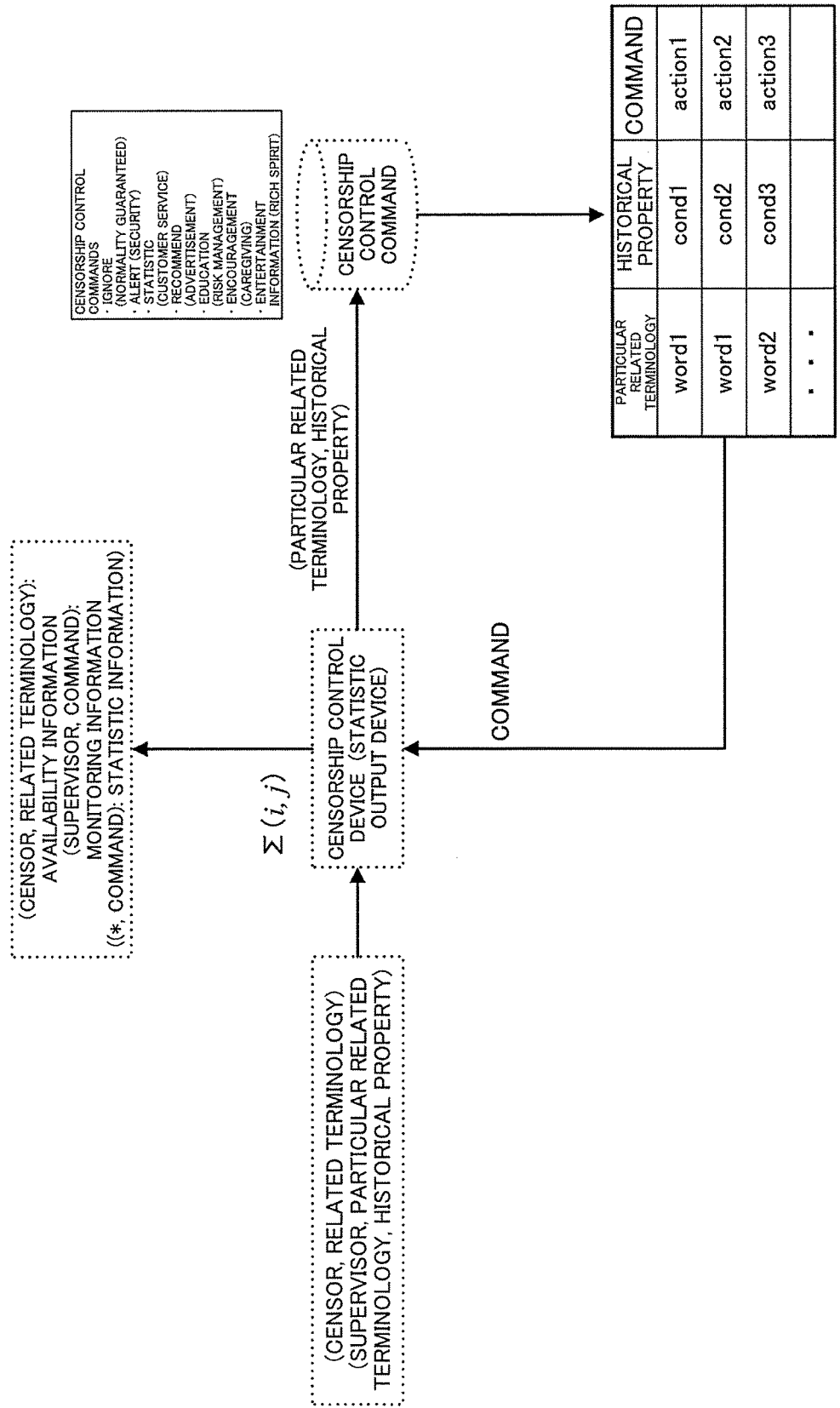
FIG. 13 is a block diagram showing an overview of a censorship control device in a preference availability system and a censorship system according to the present embodiment.

The censorship control device acquires a censorship control command based on the monitoring information such as the particular related terminology and the historical property, and then outputs it to an output conversion device (refer to FIG. 13). The censorship control command includes, for example, ignore (normality guaranteed), alert (security), statistic (customer service), recommend (advertisement), education (risk management), encouragement (caregiving), entertainment information (rich spirit), etc. The censorship control command is stored in a table so as to be able to be selected in accordance with the particular related terminology and the historical property.

The censorship control device transmits output information to the output conversion device in accordance with the contents of those censorship control commands. When the output information is output from the output conversion device, an output log is generated for storing the contents thereof, day and time, the output unique ID so as to be stored in the output storage device. Moreover, the output conversion device refers to the output log stored in the output storage device to determine whether or not the output information is to be output. For example, when the output information has been already output to an individual person indicated by the existing unique ID, the output of the output information is stopped.

Figure 11:
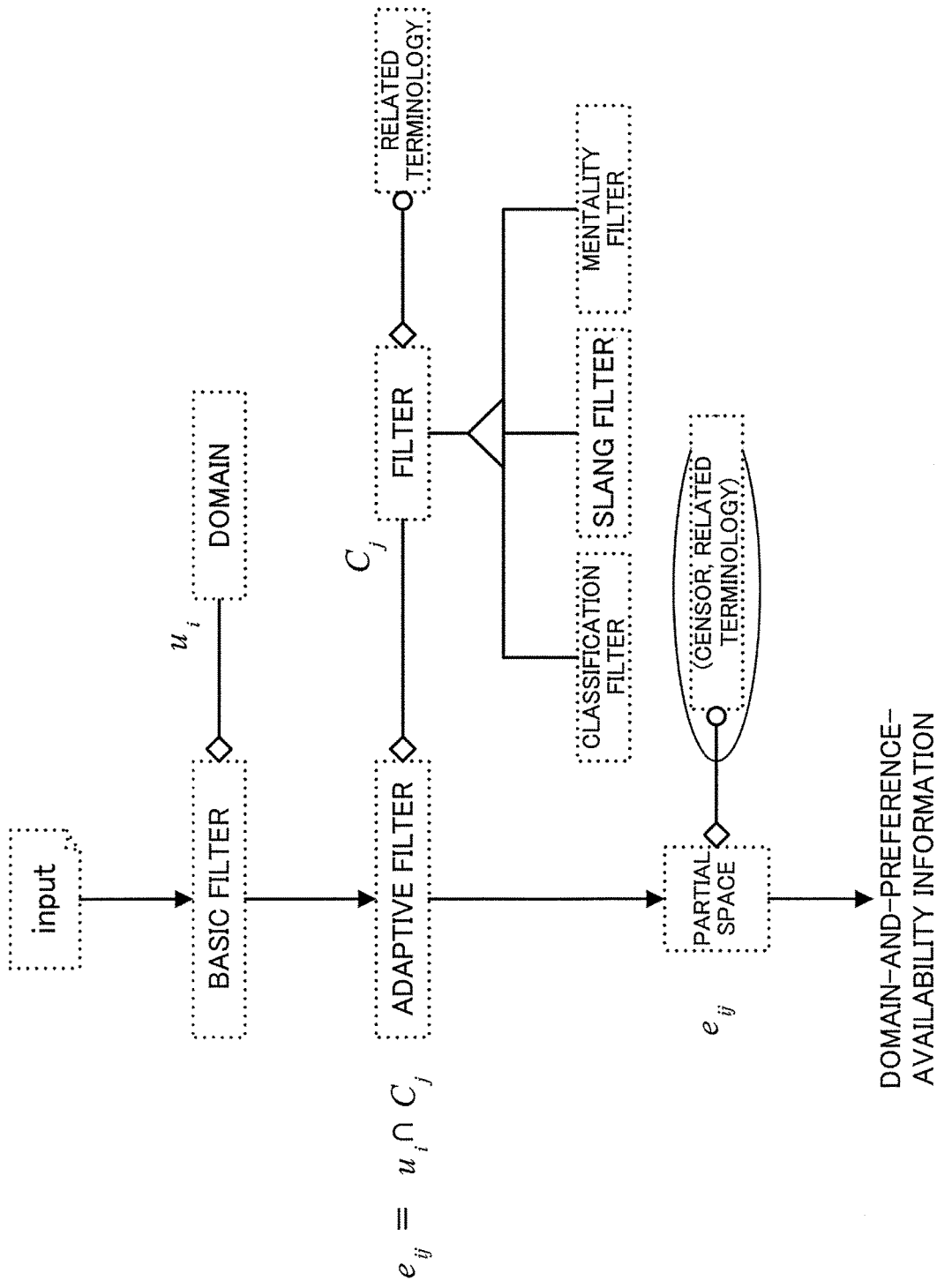
FIG. 11 is a block diagram showing an overview of a partial space generation device in a preference availability system (censorship system) available online.

FIG. 11 shows the basic filter and the adaptive filter in the censorship system available online, in which the same processing as described above is executed. Specifically, the domain $u_i$ is generated form information transmitted by an individual person by the basic filter, and the partial space $e_{ij}$ is generated from the domain $u_i$ by the adaptive filter.

<<Censorship Control Command>>

The censorship control command is the command for transmitting alert information to an individual person who is an object to be censored, and transmitting encouraging information, as a result of censorship. Furthermore, the censorship control command is the command for controlling a device and a system which are used by an individual person. Transmitting the censorship control command in this manner makes it possible to terminate the communication line of the device and system which are used by an individual person who is transmitting antisocialistic information and information counter to common sense. The censorship control command of this type can define the contents desired by an operator of the censorship system in accordance with the result of censorship.

EXAMPLE 1

Figure 14:
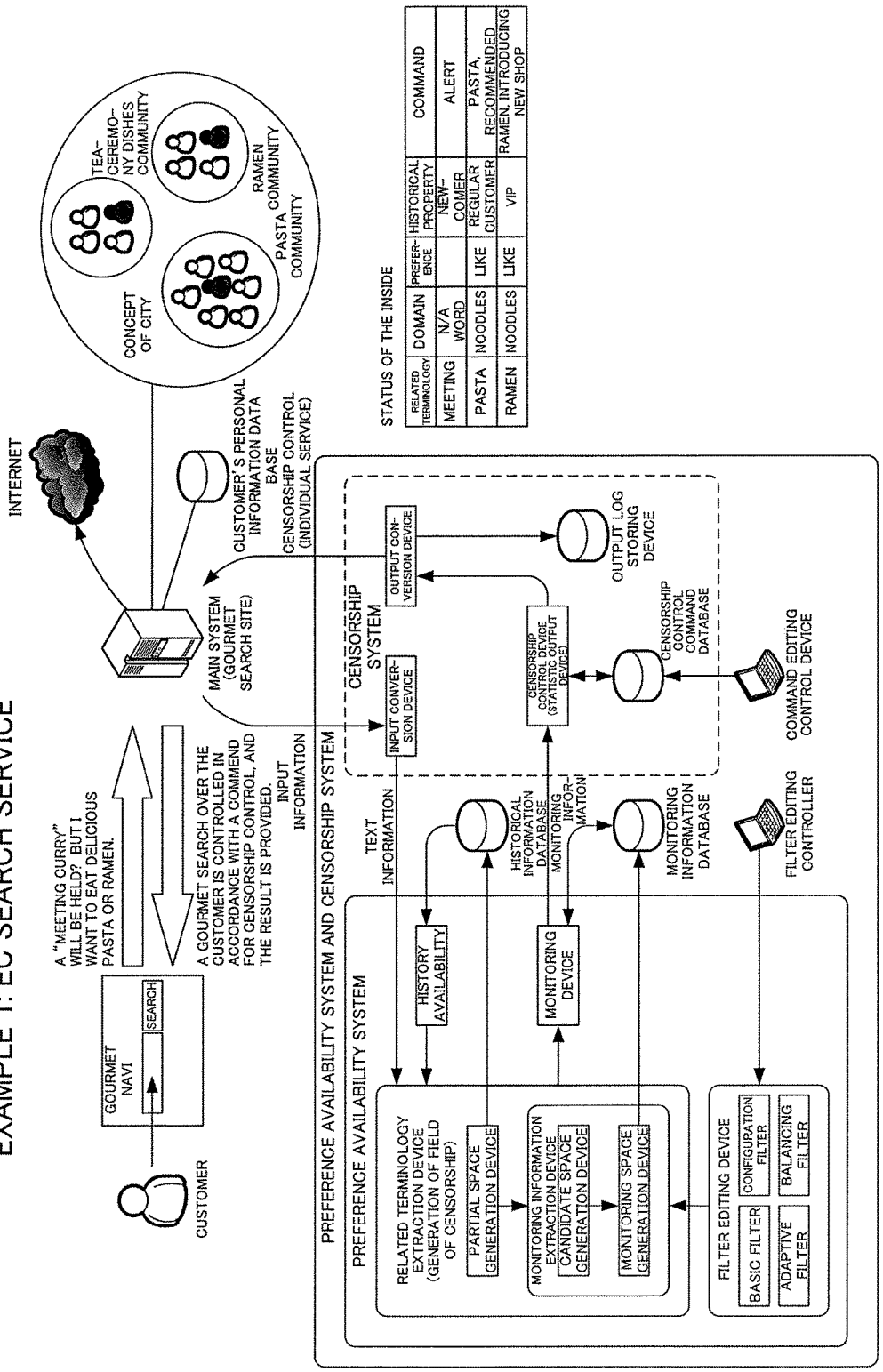
FIG. 14 is a block diagram showing a preference availability system and a censorship system according to a first working example.

FIG. 14 shows an example in which the present invention is applied to a main system which can execute an electronic commerce (e-commerce) for making contract and payment utilizing a network such as the Internet.

E-commerce is roughly classified in three types in general, that is, a business-to-business transaction is called "B to B", a business-to-consumer transaction is called "B to C", and a consumer-to-consumer transaction is called "C to C".

A typical B-to-B EC site to which the present invention is applied in this example is connected to a terminal of a plurality of individual persons over a network such as the Internet with a center focus on the main system, and is connected to a personal information database of the individual persons accessed through each of the terminals. Then, various input information is acquired from a plurality of terminal groups. In the inside of the main system, a plurality of genres of communities implicitly exists, such as a cartoon film community for those who like cartoon films and are interested in cartoon films, a gourmet community for those who mainly transmit information on foods, or the like. However, in the communities, it has been typical that groups are not available (groups cannot be extracted or there is no mechanism to extract groups).

Furthermore, as one of those EC sites, the cooperation with the main system which operates a gourmet search site ("Gourmet Navi" in FIG. 14) is achieved in this example. The present invention cooperates with the EC site, and thus the preference availability system and the censorship system (hereinafter referred to as an information processing system) can execute active processing such as interactive information provision and communication termination at the terminal side in accordance with input information input by an individual person on the search screen that is downloaded from the main system by accessing the main system through the terminal.

For example, the case will be considered in which an input information "a 'meeting curry' will be held? But I want to eat delicious pasta or ramen." is transmitted as the text input to the main server through the terminal of an individual person. When the input information is input through an input interface of the information processing system, an input conversion device converts it into a single data format (text information in the case of this example) that is addressed in the information processing system. The input information is not only a method of executing text input by key input using a keyboard or a touch panel, but an input scheme by a voice recognition described below can be employed for the input information of the present invention.

Here, the information processing system of this embodiment described above is composed of the preference availability system and the censorship system, as well as a historical information database (historical information DB), a monitoring information database (monitoring information DB), a filter editing controller for editing a variety of filters, and a command editing control device for editing a variety of censorship control commands.

Furthermore, the censorship system described above is provides with an output conversion device for outputting the censorship control command to the aforementioned input conversion device and to the outside in an appropriate output format, a censorship control command database (censorship control command DB) which stores a variety of commands edited by the command editing control device, a censorship control device which refers to the censorship control command database in accordance with the monitoring information output from the preference availability system so as to output the command to the main system via the output conversion device, and an output log storage device for storing output logs of a variety of censorship control commands output from the output conversion device.

Furthermore, the preference availability system is provided with the related terminal extraction device and the monitoring information extraction system, as well as the filter editing device for editing a variety of filters by the input from the filter editing controller. As functions of each of the devices, the functions are provided which are described in the embodiments described above. Furthermore, the preference availability system in question is also provided with a part of making the history available with a reference to the historical information data, and a monitoring device which outputs monitoring information to the censorship control device with reference to the monitoring information database in accordance with information output from the related terminology extraction device and monitoring information extraction device.

In accordance with the information processing system described above, when the input information such as "a "meeting curry" will be held? But I want to eat delicious pasta or ramen" is input, the processing data is generated from each of the input information in the state inside thereof as follows (refer to FIG. 14).

Specifically, with regard to the input information of "meeting" as the related terminology, a single domain is that it is an NG word to which an alert should be issued, and the related terminology of "meeting" is addressed in the historical definition to be done by a new comer when this information is transmitted by an ID of an individual person for the first time. Thus, the processing data of alert is generated as a command for censoring and controlling.

Furthermore, with regard to the input information of the related terminology of pasta, the domain is noodles, the preference is regarded as "like" depending on the fact that the individual person has transmitted information many times and on the contents of transmitted information, and the historical property is regarded as being a regular customer with reference to the historical information. Commands of "past" and "recommended" are thus provided in accordance with those results.

Furthermore, with regard to the input information of related terminology of ramen, the domain is noodles, the preference is regarded as "like" depending on the fact that the individual person has transmitted information of "ramen" many times and on the contents of transmitted information, and the historical property is regarded as being a regular customer because he/she has transmitted information over and over again.

Then, the processing data as the status inside thereof described above is generated as follows. When the input information from the main system is acquired at the information processing system, the processing is executed for changing/unifying the input information in the processible data format such as text. Then, the censorship space generation device and the partial space generation device of the related terminology extraction device execute the processing on the data using the aforementioned basic filter and the adaptive filter while referring to the historical information database, thereby initially generating the field of censorship described above.

Then, the candidate space generation device and the monitoring space generation device of the monitoring information extraction device described above outputs the monitoring information to the censorship system via the monitoring device by executing the processing using the configuration filter and the balancing filter as described above while referring to the monitoring information database. Then the censorship control device extracts a command in accordance with the output information from the command database, and outputs the command to the main system in order to provide the result to the terminal via the aforementioned output conversion device.

"To provide the result to the terminal" includes providing various concierge-like information, as well as an action in which, in the case where the NG word domain is generated, the communication line between the main system and the terminal of an individual person is forcedly terminated if the individual person transmits NG word information beyond a certain defined threshold value. Namely, the censorship control command output to the main system executes the provision of individual service tailored to the preference of a customer, and the output control suitable for the risk status of the input contents. In the case of the aforementioned gourmet site, the search on the gourmet is controlled to provide the result to an individual person (a customer) in accordance with the censorship control command.

The example 1 is as described above. The information processing system of the present invention is characterized to be provided with a field-of-censorship generation function for executing a plurality kinds of filtering processes to a plurality of kinds of input information from terminals of a plurality of individual persons acquired via the main system; and a monitoring function for executing an availability function for making input information newly input from the main system available, and outputting the censorship control command to execute one of the censorship control commands previously prepared as a result of the aforementioned execution to the main system at the terminal from which the input information is acquired.

EXAMPLE 2

Figure 15:
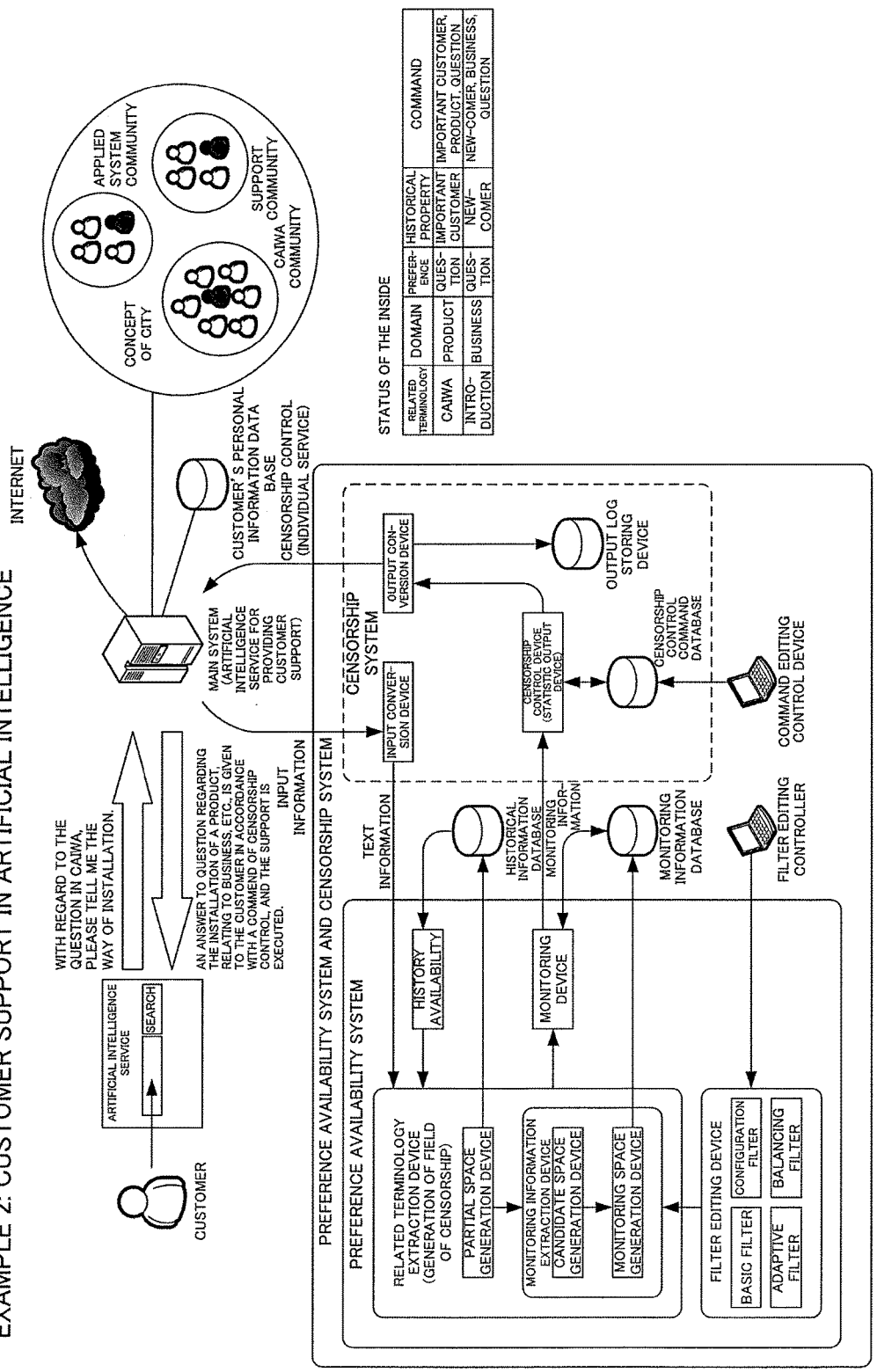
FIG. 15 is a block diagram showing a preference availability system and a censorship system according to a second working example.

While Example 1 has illustrated the example in which the present invention is applied to the EC site, FIG. 15 shows Example 2 which is the example of cooperating the main system for providing an artificial intelligence service which supports a customer with the present invention. The basic configuration of the information processing system in Example 2 is similar to that illustrated in Example 1, and what is different from Example 1 is that the main system to be cooperated is different, and each of the filters is different because the input information to be input is different due to the difference of the cooperated main system, and resultingly the censorship control command for outputting to the main system is different.

More specifically, in this Example 2, since the main system is for providing the artificial intelligence service which supports a customer, "I'm going to ask question about Caiwa (product name). Please tell me how to introduce it." can be considered as the input information input to the aforementioned main system, for example. In this case, as shown in FIG. 15, the inside status as a result of the execution of the data processing in order to output the censorship control command is as follows: with regard to the related terminology of "Caiwa", the domain is "product" depending on the fact that "Caiwa" is a product name, it is regarded as "an important customer" depending on the ID of the individual person, the domain of "product", and the historical information, and the preference is regarded as "question" depending on the transmitted information of "question" in the input information. The censorship control commands output as a result to the main system are stored as "important customer", "product" and "question". Moreover, the related terminology of "introduce" is addressed in such a way that the domain is "business", the preference is "question" depending on the transmitted information of "please tell me", and the historical property is "new comer" with reference to the historical information. Output commands is output to the main system as the censorship control command as a result of "new corner", "business", and "question".

EXAMPLE 3

Figure 16:
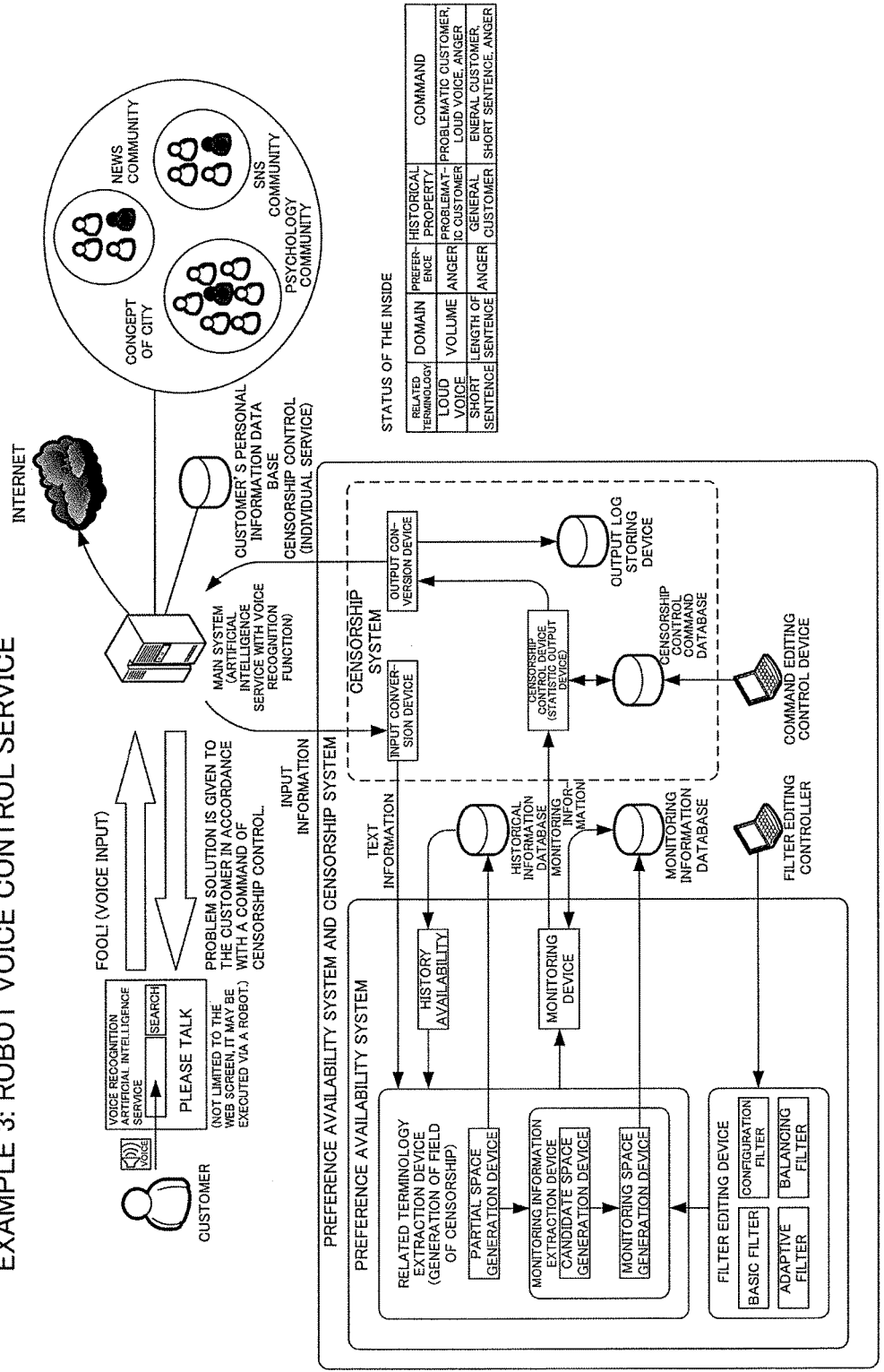
FIG. 16 is a block diagram showing a preference availability system and a censorship system according to a third working example.

While Example 1 has illustrated the example in which the present invention is applied to the EC site and Example 2 has illustrated the example in which the present invention is applied to the main system responsible for the customer service in the an artificial intelligence service, FIG. 16 shows Example 3 which is the example in which the present invention is applied to a main system responsible for a robot voice control service. The basic configuration of the information processing system in this Example is similar to those illustrated in Examples 1 and 2, and what is different from Examples 1 and 2 is that the main system to be cooperated is different, and each of the filters is different because the input information to be input is different due to the difference of the cooperated main system, and resultingly the censorship control command for outputting to the main system is different. In addition, what is different is that the input from the terminal in Example 3 is executed by a voice input while the input scheme therefrom in the aforementioned Examples 1 and 2 is mainly from a keyboard, and that the amount of characteristic of voice is replaced with text data to make use thereof.

Then, since it is a voice input, the aforementioned filters are prepared so that the amount of characteristic such as intensity of volume has an effect on the input voice. The domain in accordance with feeling is to be generated depending on the intensity of volume.

Specifically, the case will be considered in which the main system displays a guide screen "please speak" for facilitating the transmission of information to a monitor at the terminal side, and then a voice input "Fool!" is done to a microphone connected to the terminal in a loud voice with the volume beyond a predetermined threshold value. Of course, the aforementioned guide screen may be of a system for bidirectionally interacting through a robot, instead of the web screen.

The voice input in this case is regarded as "loud voice" because it has been made with the volume beyond the certain threshold value, and thus the domain is "volume", the preference is "anger", and the historical property is "problematic customer" with reference to the past history. As a result, the censorship control commands are "problematic customer", "loud voice", and "anger". Furthermore, by means of the filter of length of sentence, the related terminology is regarded as "short sentence" because the voice input "fool" is short, the domain is "length of sentence", and the historical property is "general customer" depending on the past history. The censorship control commands acquired as a result thereof are "general customer", "short sentence", and "anger".

In this manner, in addition to recognizing the voice that is voice input as text to process the meaning of transmitted information by the filters similar to Examples 1 and 2, an analysis on feeling can be conducted on the basis of the volume and length of sentence thereof in the case of voice input. Namely, the censorship control command which gives a reply while taking a modest attitude can be output as the censorship control command to the main system if an individual person gets angry, and the censorship control command for addressing the customer as being problematic aside from addressing the anger can be output in the case of a problematic customer who is frequently addressed in much the same way. Therefore, addressing in accordance with the censorship control command makes it possible for anybody to easily resolve the problem.

<<Other Aspect>>

Furthermore, according to the present invention, it is also possible to provide the censorship system or censorship function which takes note of individual preference information which has been often left untreated in the field of censorship, and establishes a technique for organizing the expression contents thereof as the property in the field of censorship so as to be connected to the individual service of the main system.

Furthermore, according to the present invention, in the artificial intelligence system which answers questions from users, the artificial intelligence system is connected with the censorship system or censorship function described above, so that it is also possible to provide the artificial intelligence system which answers questions reflecting the preference information existing in the field of censorship.

An information processing system according to another aspect of the present invention can be provided with:

a field-of-censorship generation device for decomposing individual person generated data generated by many individual persons who take part in the main system into a plurality of decomposed data that can identify the meaning thereof, extracting data that satisfies both a predetermined relation condition characterized for each community regarding an object indicated by each of the decomposed data and a predetermined characteristic condition characterized for each community regarding the object, and generating a collection of first extracted data extracted thereby as a field of censorship; and a device for making particularity available for extracting data that satisfies a particularity condition characterized for each community indicating a predetermined particularity in connection with the object from the collection of the first extracted data, and detecting the predetermined particularity from second extracted data extracted thereby to make it available.

Furthermore, in "decomposing individual person generated data generated by an individual person into a plurality of decomposed data that can identify the meaning, extracting data that satisfies both a predetermined relation condition characterized for each community regarding an object indicated by each of the decomposed data and a predetermined characteristic condition characterized for each community regarding the object" described above, the text data is employed as a linchpin data format as the data that can identify the meaning, as described in the aforementioned embodiments of the present invention. However, if other data formats that can identify the meaning appears instead of the text data in future, those data formats can be applied to the present invention.

In this manner, the present invention is not limited to the text data. The case where the text data is employed is, however, as follows. Specifically, the information processing system according to another aspect of the present invention can be one which is provided with:

a field-of-censorship generation device for decomposing text data based on individual person generated data generated by an individual person into decomposed data that can identify the meaning, extracting data that satisfies both a predetermined relation condition characterized for each community regarding an object indicated by the decomposed text data and a predetermined characteristic condition characterized for each community regarding the object, and generating a collection of first extracted data extracted thereby as a field of censorship;

a device for making particularity available for extracting data that satisfies a particular condition indicating a predetermined particularity characterized for each community regarding the object from the collection of the first extracted data, and detecting the predetermined particularity from second extracted data extracted thereby to make it available; and a monitoring device for determining an individual person to be monitored and the contents of monitoring for controlling the monitoring based on the second extracted data.

EXPLANATION OF REFERENCE NUMERALS

10 Network
20 Server
100 Monitoring system, censorship system, preference availability system

The invention claimed is:

1. A method for making a preference available, the method comprising the steps of:
    receiving, by a processor, from a censorship device, data generated by an individual person that is within a field-of-censorship;
    generating, by the processor, historical information regarding a history of an object indicated by text data based on the received individual person generated data;
    extracting, by the processor, historical text data that satisfies a predetermined historical condition regarding the generated historical information;
    generating, by the processor, a number of references in connection with a user ID that identifies the individual person who has generated the individual person generated data, the number of references indicating a number of times the text data is at least one of: re-posted, re-tweeted or referred to in an email chain;
    extracting, by the processor, particular text data that satisfies a predetermined reference condition, based on the number of references, out of the historical text data;
    transmitting, by the processor, to the censorship device, the particular text data thereby making the particular text data available to the censorship system; and
    generating, by the censorship device, a censorship control command as a specific executable command for the individual person based on the related text data, wherein the censorship control command causes blocking of information containing the particular text data.

2. The method for making the preference available according to claim 1, further comprising generating, by the processor, monitoring information based on the historical text data.

3. The method of claim 1, further comprising: decomposing the received data generated by the individual person that is within the field-of-censorship, the decomposing including: morphological analysis that separates text data into predetermined parts of speech including one or more of: a noun, a verb, and an adjective.

4. The method of claim 3, wherein each of the parts of speech are capable of identifying a meaning, respectively.

5. The method of claim 1, further comprising: determining a predetermined particularity regarding a predetermined object based on whether one of: an amount, a degree and a rate of change, regarding the predetermined object is larger than or smaller than a predetermined threshold value.

6. The method of claim 1, further comprising: defining an object associated with a preference of the individual person based on user input by an operator.

7. The method of claim 6, wherein the preference of the individual person is a property or a feature of the object.

8. The method of claim 1, wherein the preference of the individual person includes an objective characteristic and a characteristic that is subjectively expressed based on a feeling and/or an emotion regarding the object.

9. The method of claim 1, wherein the preference of the individual person includes an emotional characteristic, the emotional characteristic including at least one of: an emotional expression with aggression, an emotional expression with sentiment, an emotional expression with impulse, and an expression of desire regarding a predetermined object.

10. The method of claim 1, wherein the preference of the individual person includes a statistical characteristic including at least one of: a number of times and time.

11. The method of claim 3, further comprising:
    extracting related text data that both satisfies: (i) a predetermined relation condition regarding an object indicated by the decomposed text data, and (ii) a predetermined characteristic condition based on an attribute that corresponds to the preference of the individual person; and
    outputting the censorship control command based on the related text data.

12. The method of claim 3, further comprising:
    extracting related text data, from the decomposed data, that both: (i) includes one or more terms related to an object included in the received individual person generated text data and (ii) satisfies a predetermined characteristic condition regarding the object based on the preference of the individual person;
    extracting, from the related text data, a particular expression appearing in the related text data that satisfies a particular condition indicating a predetermined particularity in connection with the specific object; and
    transmitting the particular expression to a censorship device, thereby making the particular expression available to the censorship device, wherein the censorship device generates the censorship control command as the specific executable command for the individual person based on the particular expression, the censorship control command causing blocking of information containing the particular expression.

13. The method of claim 1, wherein the determined preference depends on at least one of: (i) the fact that the individual person has transmitted information regarding the predetermined object or related terminology many times and (ii) the contents of the transmitted information.

14. A method of censorship, the method comprising the steps of:
   generating, by an information availability device, historical information regarding a history of an object indicated by individual person generated data generated by an individual person;
   extracting, by the information availability device, text data that satisfies a predetermined historical condition regarding the generated historical information out of the individual person generated data;
   determining, by the information availability device, a number of references to an object in the extracted text data in connection with a user ID capable of identifying the individual person who has generated the individual person generated data, the number of references to the object indicating a number of times the object indicated by the individual person generated data is referred to, the number of times the object is referred to being a number of times the object is one of: re-posted, re-tweeted and referred to in an email chain;
   extracting, by the information availability device, related text data that satisfies a predetermined reference condition based on the number of references;
   transmitting, by the information availability device to a censorship device via a network, a particular expression related to the object;
   generating, by the censorship device, monitoring information based on the related text data; and
   generating, by the censorship device, a censorship control command as a specific executable command for the individual person based on the monitoring information, wherein the censorship control command causes blocking of information containing the particular expression.

15. The method of claim 14, wherein the particular expression is based on whether one of: an amount, a degree and a rate of change, regarding the object indicated by the related text data is larger than or smaller than a predetermined threshold value.

16. A censorship system comprising:
   one or more processors programmed to:
      receive, from a censorship device, data generated by an individual person that is within a field-of-censorship;
      generate historical information regarding a history of an object indicated by text data based on the received individual person generated data;
      extract historical text data that satisfies a predetermined historical condition regarding the generated historical information;
      generate a number of references in connection with a user ID that identifies the individual person who has generated the individual person generated data, the number of references indicating a number of times the text data is at least one of: re-posted, re-tweeted or referred to in an email chain;
      extract particular text data that satisfies a predetermined reference condition, based on the number of references, out of the historical text data;
      transmit, to the censorship device, the particular text data thereby making the particular text data available to the censorship system; and
      generate a censorship control command as a specific executable command for the individual person based on the related text data, wherein the censorship control command causes blocking of information containing the particular text data.

17. The censorship system of claim 16, wherein the one or more processors are further programmed to: generate monitoring information based on the historical text data.

18. The censorship system of claim 16, wherein the one or more processors are further programmed to: define an object associated with a preference of the individual person based on user input by an operator.

19. The censorship system of claim 16, wherein the preference of the individual person includes an objective characteristic and a characteristic that is subjectively expressed based on a feeling and/or an emotion regarding the object.

20. A censorship system comprising:
   one or more processors programmed to:
      generate historical information regarding a history of an object indicated by individual person generated data generated by an individual person;
      extract text data that satisfies a predetermined historical condition regarding the generated historical information out of the individual person generated data;
      determine a number of references to an object in the extracted text data in connection with a user ID capable of identifying the individual person who has generated the individual person generated data, the number of references to the object indicating a number of times the object indicated by the individual person generated data is referred to, the number of times the object is referred to being a number of times the object is one of: re-posted, re-tweeted and referred to in an email chain;
      extract related text data that satisfies a predetermined reference condition based on the number of references; and
      transmit, to a censorship device via a network, a particular expression related to the object, wherein
         the censorship device generates: (i) monitoring information based on the related text data, and (ii) a censorship control command as a specific executable command for the individual person based on the monitoring information, and
         the censorship control command causes blocking of information containing the particular expression.

21. The censorship system of claim 20, wherein the one or more processors are further programmed to: define an object associated with a preference of the individual person based on user input by an operator.

22. The censorship system of claim 18, wherein the preference of the individual person is a property or a feature of the object.

23. The censorship system of claim 21, wherein the preference of the individual person is a property or a feature of the object.

24. The censorship system of claim 20, wherein the preference of the individual person includes an objective characteristic and a characteristic that is subjectively expressed based on a feeling and/or an emotion regarding the object.

* * * * *